United States Patent [19]
Kosugi

[11] Patent Number: 5,757,576
[45] Date of Patent: May 26, 1998

[54] DISK APPARATUS, AND PHASE DEMODULATING DEVICE AND METHOD FOR A DISK APPARATUS

[75] Inventor: Tatsuhiko Kosugi, Kawasaki, Japan

[73] Assignee: Fujitsu Limited, Kawasaki, Japan

[21] Appl. No.: 681,660

[22] Filed: Jul. 29, 1996

[30] Foreign Application Priority Data

Dec. 28, 1995 [JP] Japan .................. 7-343126

[51] Int. Cl.$^6$ ................................ G11B 5/596
[52] U.S. Cl. .................. 360/78.14; 360/77.05; 360/51
[58] Field of Search .............. 360/51, 77.02, 360/77.05, 77.07, 77.11, 78.04, 78.14

[56] References Cited

U.S. PATENT DOCUMENTS

| | | | |
|---|---|---|---|
| 4,499,511 | 2/1985 | Sugaya ............ | 360/77.08 X |
| 4,511,938 | 4/1985 | Betts ............ | 360/77.08 |
| 4,549,232 | 10/1985 | Axmear et al. ....... | 360/77.05 |
| 4,642,562 | 2/1987 | Collins et al. ........ | 360/77.08 X |
| 4,890,299 | 12/1989 | Dolivo et al. ........ | 375/290 |
| 5,483,393 | 1/1996 | Mento et al. ........ | 360/77.08 |
| 5,523,900 | 6/1996 | Kosugi et al. ........ | 360/78.14 X |

FOREIGN PATENT DOCUMENTS

| | | |
|---|---|---|
| 61-59677 | 3/1986 | Japan . |
| 4157678 | 5/1992 | Japan . |
| 4168672 | 6/1992 | Japan . |
| 4337574 | 11/1992 | Japan . |
| 5114147 | 5/1993 | Japan . |
| 5159488 | 6/1993 | Japan . |
| 6243574 | 9/1994 | Japan . |

OTHER PUBLICATIONS

Kosugi et al., Disk Device, Patent Abstracts of Japan, Publication No. 07-28794949, Oct. 31, 1995.

*Primary Examiner*—Aristotelis M. Psitos
*Assistant Examiner*—Larry T. Cullen
*Attorney, Agent, or Firm*—Greer, Burns & Crain, Ltd.

[57] ABSTRACT

A disk apparatus in which the position of a head is detected using servo information recorded on a recording plane of a disk. A first phase difference detecting section uses a zero-cross signal, a master clock, servo patterns corresponding to N cylinders (N is an integer equal to or greater than 2) so as to discriminate the different polarity information items contained in servo patterns from one another and to output phase difference information. A second phase difference detecting section uses the zero-cross signal, the master clock, half the servo patterns corresponding to the N cylinders so as to output phase difference information without discriminating the different polarity information items contained in the servo patterns from one another. When seek operation is performed, a selecting section outputs the phase difference information delivered from the first phase difference detecting section. When on-track control is performed, the selecting section outputs the phase difference information delivered from the second phase difference detecting section. A phase difference information integrating section integrates the phase difference information selected by the selecting section and outputs a position control signal for controlling the positioning of the head. The position signal can be demodulated accurately during/high speed seek operation of the head, without increasing complexity of the processing for the demodulation of the positional signal. The object is to make it possible to demodulate a position signal accurately during high speed seek operation of a head, without increasing complexity of the processing for the demodulation of the positional signal, thereby increasing the reliability of the disk apparatus.

5 Claims, 18 Drawing Sheets

FIG. 9

LOGIC DESIGN OF MASTER CLOCK

|  | EVEN | ODD |
|---|---|---|
| CYL 0 | 4 | 4 |
| CYL 1 | 5 | 3 |
| CYL 2 | 6 | 2 |
| CYL 3 | 7 | 1 |
| CYL 4 | 0 | 0 |
| CYL 5 | 1 | 7 |
| CYL 6 | 2 | 6 |
| CYL 7 | 3 | 5 |

FIG. 10

LOGIC DESIGN OF DEMOD-WIN

|  | EVEN | ODD |
|---|---|---|
| CYL 0 | 0 | 7 |
| CYL 1 | 1 | 6 |
| CYL 2 | 2 | 5 |
| CYL 3 | 3 | 4 |
| CYL 4 | 4 | 3 |
| CYL 5 | 5 | 2 |
| CYL 6 | 6 | 1 |
| CYL 7 | 7 | 0 |

FIG. 13

LOGIC DESIGN OF MASTER CLOCK

|       | EVEN | ODD |
|-------|------|-----|
| CYL 0 | 2    | 2   |
| CYL 1 | 3    | 1   |
| CYL 2 | 0    | 0   |
| CYL 3 | 1    | 3   |

FIG. 14

LOGIC DESIGN OF DEMOD-WIN

|  | EVEN | ODD |
|---|---|---|
| CYL 0 | 0 | 3 |
| CYL 1 | 1 | 2 |
| CYL 2 | 2 | 1 |
| CYL 3 | 3 | 0 |

DISK APPARATUS, AND PHASE DEMODULATING DEVICE AND METHOD FOR A DISK APPARATUS

BACKGROUND OF THE INVENTION

1. Field of the Invention

The present invention relates to a disk apparatus in which the position of a head is detected using servo information recorded on a disk plane of, e.g., a magnetic disk apparatus. The present invention also relates to a phase demodulating device and method suitable for such a disk apparatus.

2. Description of the Related Art

Terminal equipment such as computers have conventionally been provided with external storage devices, e.g., a magnetic disk apparatus, in order to ensure a larger storage capacity.

In such a magnetic disk apparatus serving as a storage device, a head is moved in a radial direction of a rotating magnetic disk so as to be positioned over a target track. Through the thus positioned head, recorded data are read out from the track of the magnetic disk, or data are written onto the track of the magnetic disk.

An increase in storage density, particularly in track density, is inevitable to render the magnetic disk apparatus more compact as well as to increase the storage capacity of the magnetic disk apparatus. In addition, there has been a demand for a higher-speed seek operation of the head so as to cope with an increase in the speed of data read and data write.

The position of the head during data read and data write is detected using a two-phase servo pattern recorded on a recording plane of a magnetic disk medium. A peak-hold method and a zero-crossing method have been used for detection of the head position.

In the peak-hold method, servo information recorded on a recording plane of the magnetic disk is read out, and the peak of a waveform representing the read information is detected. The head position is detected through use of this peak.

In the zero-cross method, servo information which is recorded as phase information on a recording plane of the magnetic disk is read out. Zero-cross points of a waveform representing the read information are detected so as to produce a zero-crossing signal. The head position is detected based on a phase difference determined using the zero-cross signal.

The peak-hold method has a problem such that noise and variations in the level (height) of the recording plane of the disk medium directly affect the result of the positional detection. For this reason, it has become increasingly common practice to employ the zero-cross method to detect the head position.

FIG. 16 shows a phase servo pattern used when the head position is detected using the zero-cross method. A servo plane of the magnetic disk is divided in units, each including four cylinders, i.e., 0th to 3rd cylinders. A phase servo pattern is recorded for each of the respective cylinders. Each phase servo pattern extends in the circumferential direction and has a different phase.

As shown in FIG. 16, each phase servo pattern comprises a first field EVEN 1, a second field ODD, and a third field EVEN 2. Servo patterns having identical phases are respectively recorded in the first field EVEN 1 and the third field EVEN 2. A servo pattern having the opposite phase is recorded in the second field ODD. The position of the head under movement is read at the center position of the second field ODD.

FIG. 17 shows the detection of a phase difference in the first field EVEN 1 and in the third field EVEN 2. FIG. 17 shows the case where the servo patterns are recorded such that the period of each servo pattern corresponds to four reference clock pulses, which makes it possible to detect the position of the head within four cylinders 0th to 3rd.

Assuming that each thick line in FIG. 17 represents the reference phase of the reference clock, when the head is positioned at location 600 which corresponds to the center of the second cylinder, the phase difference between the reference phase of the reference clock and the servo pattern becomes half the period of the servo pattern as represented by a phase difference signal 610. When the head is positioned at location 620 which corresponds to the center of the first cylinder, the phase difference between the reference phase of the clock and a lead pulse of the servo pattern becomes one-quarter of the period of the servo pattern, as represented by a phase difference signal 630. When the head is positioned at location 640 which corresponds to the center of the third cylinder, the phase difference between the reference phase and the lead pulse of the servo pattern becomes ¾ of the period of the servo pattern, as represented by a phase difference signal 650. Further, when the head is positioned at the location which corresponds to the center of the 0th cylinder, the phase difference between the reference phase of the clock and the servo pattern becomes zero, or one period of the servo pattern.

FIG. 18 shows the detection of a phase difference arising in the second field ODD.

When the head is positioned at location 660 which corresponds to the center of the second cylinder, the phase difference between the reference phase of the clock and the lead pulse of the servo pattern becomes half the period of the servo pattern, as represented by a phase difference detection signal 670. When the head is positioned at location 680 which corresponds to the center of the third cylinder, the phase difference between the reference phase of the clock and the lead pulse of the servo pattern becomes a quarter of the period of the servo pattern, as represented by a phase difference detection signal 690.

So long as the phase difference between the reference phase of the clock and the lead pulse of the servo pattern is detected, it is possible to detect at which of the cylinders 0th to 3rd the head is currently positioned.

In practice, when the detection of a head position is performed using the zero-cross method, the mean value of a number of phase differences, obtained as a result of the detection being carried out several times, is used for detecting the head position. Since the detection of a phase difference is carried out several times, it becomes impossible to continuously obtain a positional signal. However, by averaging detected phase differences, it is possible to accurately detect the head position without the influence of noise.

In order to meet a demand for a higher-speed seek operation of a head, a digital circuit which uses a high-speed processor is adopted as a head positioning circuit.

In position control of the head using the digital circuit, it is only necessary to obtain positional information at intervals corresponding to the sampling period, and hence continuous positional information is unnecessary. The digital circuit is suitable for detection of the head position using the zero-cross method.

Accurate detection of the head position becomes feasible so long as variations in the level of the recording plane of the disk medium do not affect variations in the detection of the peak of the signal.

The above-described phase servo pattern includes N-polarity information which is recorded as a result of the magnetization of the disk medium into the magnetic north pole, and S-polarity information which is recorded as a result of magnetizing the disk medium into the magnetic south pole. In the detection of the head position, duty pulses are produced by use of both N and S polarity information of the servo patterns for four cylinders.

However, when the above-mentioned phase servo pattern is used, a positional signal demodulating circuit can demodulate the positional signal only within a range of three cylinders, i.e., the target cylinder, one cylinder before the target cylinder, and one cylinder after the target cylinder. The seek speed of the head, which is defined as the number of cylinders over which the head travels within each sampling period for position detection, must be set to be equal to or less than three. As the seek operation becomes faster, the possibility of occurrence of errors in demodulation of the positional signal increases.

If the positional signal is erroneously demodulated, the number of cylinders over which the positional signal demodulation circuit can demodulate position signals becomes narrower. This, in turn, induces a seek error, which results in deterioration of the reliability of the disk apparatus.

To prevent this problem, a technique as disclosed in Japanese Patent Application Laid-Open No. 6-243574 has been proposed.

The technique disclosed in the above identified patent publication is directed to head positioning control using a peak-hold detecting method which uses an analog circuit. For this reason, the above described technique is not applicable to the head positioning control based on the zero-cross method which uses a digital circuit.

The following method has been proposed as a method of demodulating a servo pattern which can cope with high-speed seek operation of the head which is used for zero-cross type positioning control using a digital circuit.

First, a description will be given of duty pulses, which constitute phase difference information produced using a zero-cross signal. If the head is positioned at a target cylinder, the duty pulses have a duty ratio of 50%. On the other hand, if the head is positioned at a cylinder different from the target cylinder as a result of the high-speed seek action of the head, the duty pulses have a duty ratio either greater than or less than 50%.

In order to adjust the duty pulses such that the duty ratio of an actually obtained duty pulses becomes 50%, a zero-cross signal and a master clock used in producing the duty pulses are delayed. As a result, erroneous demodulation of a positional signal occurring when the head undergoes high-speed seek operation is prevented.

This method utilizes delay means for delaying the zero-cross signal and the master clock, and therefore the use of this method renders complicated the demodulation of the positional signal.

SUMMARY OF THE INVENTION

The present invention was accomplished in view of the foregoing problems, and an object of the present invention is to provide a disk apparatus in which a positional signal can be demodulated accurately during high speed seek operation of a head, without increasing complexity of the processing for the demodulation of the positional signal.

Another object of the present invention is to provide a phase demodulating device and method for a disk apparatus in which a positional signal can be demodulated accurately during high speed seek operation of a head, without increasing complexity of the processing for the demodulation of the positional signal.

To this end, the present invention provides a disk apparatus in which a plurality of servo patterns, each including different polarity information items alternately recorded in the circumferential direction, are sequentially recorded on a disk medium in the radial direction thereof with a predetermined phase difference with respect to each other, so as to correspond to respective cylinders, and the positioning of a head used for reading data from, or writing data onto, the disk medium is controlled on the basis of the servo patterns. The disk apparatus comprises a zero-cross signal detecting section for detecting a zero-cross signal on the basis of the servo patterns, and a master clock generating section for generating a master clock on the basis of the servo patterns. The disk apparatus further comprises first and second phase difference detecting sections, a selecting section, and a phase difference information integrating section. The first phase difference detecting section uses the zero-cross signal detected by the zero-cross signal detecting section and the master clock supplied from the master clock generating section and further uses servo patterns corresponding to N cylinders (N is an integer equal to or greater than 2) so as to discriminate the different polarity information items contained in the servo patterns from one another and to output information regarding a phase difference between the reference phase of the master clock and detection timing of the servo patterns produced from the zero-cross signal. The second phase difference detecting section uses the zero-cross signal detected by the zero-cross signal detecting section and the master clock supplied from the master clock generating section and further uses half the servo patterns corresponding to the N cylinders so as to output information on a phase difference between the reference phase of the master clock and detection timing of the servo patterns produced from the zero-cross signal without discriminating the different polarity information items contained in the servo patterns from one another. The selecting section outputs the phase difference information delivered from the first phase difference detecting section when seek operation is performed and outputs the phase difference information delivered from the second phase difference detecting section when on-track control is performed. The phase difference information integrating section integrates the phase difference information selected by the selecting section and outputs a position control signal for controlling the positioning of the head.

Accordingly, in the disk apparatus of the present invention, the selecting section outputs the phase difference information delivered from the first phase difference detecting section when seek operation is performed, and outputs the phase difference information delivered from the second phase difference detecting section when on-track control is performed. As a consequence, it becomes possible to demodulate the positional signal through use of a suitable method depending on whether the disk apparatus is in the process of a seek operation, which requires a high speed, or in the process of on-track control, which requires a position detection accuracy, thereby contributing to improvements in the reliability of the disk apparatus.

The present invention also provides a phase demodulating device for a disk apparatus comprising a disk medium on which a plurality of servo patterns, each including different polarity information items alternately recorded in the circumferential direction, are sequentially recorded in the radial direction thereof with a predetermined phase difference with respect to each other, so as to correspond to respective cylinders. The phase demodulating device comprises a zero-cross signal detecting section for detecting a zero-cross signal corresponding to each polarity information contained in the servo patterns, and a master clock generating section for generating a master clock on the basis of the servo patterns. The disk apparatus further comprises first and second phase difference detecting sections, and a selecting section. The first phase difference detecting section outputs information on a phase difference between detection timing of the servo patterns produced from the zero-cross signal corresponding to any one of the polarity information items and the reference phase of the master clock. The second phase difference detecting section outputs information on a difference between detection timing of the servo patterns produced from the zero-cross signal corresponding to each polarity information and the reference phase of the master clock. The selecting section selectively outputs phase difference information delivered from the first phase difference detecting section or phase difference information delivered from the second phase difference detecting section.

In the phase demodulating device for a disk apparatus of the present invention, it is possible to demodulate the positional signal through use of a suitable method depending on whether the disk apparatus is in the process of a seek operation, which requires a high speed, or in the process of on-track control, which requires a position detection accuracy, thereby contributing to improvements in the reliability of the disk apparatus.

The present invention further provides a phase demodulating method for a disk apparatus in which a plurality of servo patterns, each including different polarity information items alternately recorded in the circumferential direction, are sequentially recorded on a disk medium in the radial direction thereof with a predetermined phase difference with respect to each other, so as to correspond to respective cylinders, and the positioning of a head used for reading data from, or writing data onto, the disk medium is controlled on the basis of the servo patterns. In the phase demodulating method, servo patterns corresponding to N cylinders (N is an integer equal to or greater than 2) are used in a predetermined control state so as to discriminate the different polarity information items contained in the servo patterns from one another and to carry out phase demodulation for controlling the positioning of a head used for reading data from, or writing data to, the disk medium. In another control state different from the predetermined control state, half the servo patterns corresponding to the N cylinder are used so as to carry out the phase demodulation for controlling the positioning of the head without discriminating the different polarity information items contained in the servo patterns from one another.

In the phase demodulating method for a disk apparatus of the present invention, it is possible to demodulate the positional signal through use of a suitable method depending on whether the disk apparatus is in the process of a seek operation, which requires a high speed operation, or in the process of on-track control, which requires a position detection accuracy, thereby contributing to improvements in the reliability of the disk apparatus.

BRIEF DESCRIPTION OF THE DRAWINGS

FIG. 9 is a table showing data for logic design of master clocks in the eight-cylinder group;

FIG. 10 is a table showing data for logic design of demodulation windows in the eight-cylinder group;

FIG. 13 is a table showing data for logic design of master clocks in the four-cylinder group;

FIG. 14 is a table showing data for logic design of demodulation windows in the four-cylinder group;

DESCRIPTION OF THE PREFERRED EMBODIMENTS (a) Aspect of the Invention

An aspect of the present invention will be described with reference to the accompanying drawings.

Figure 1:
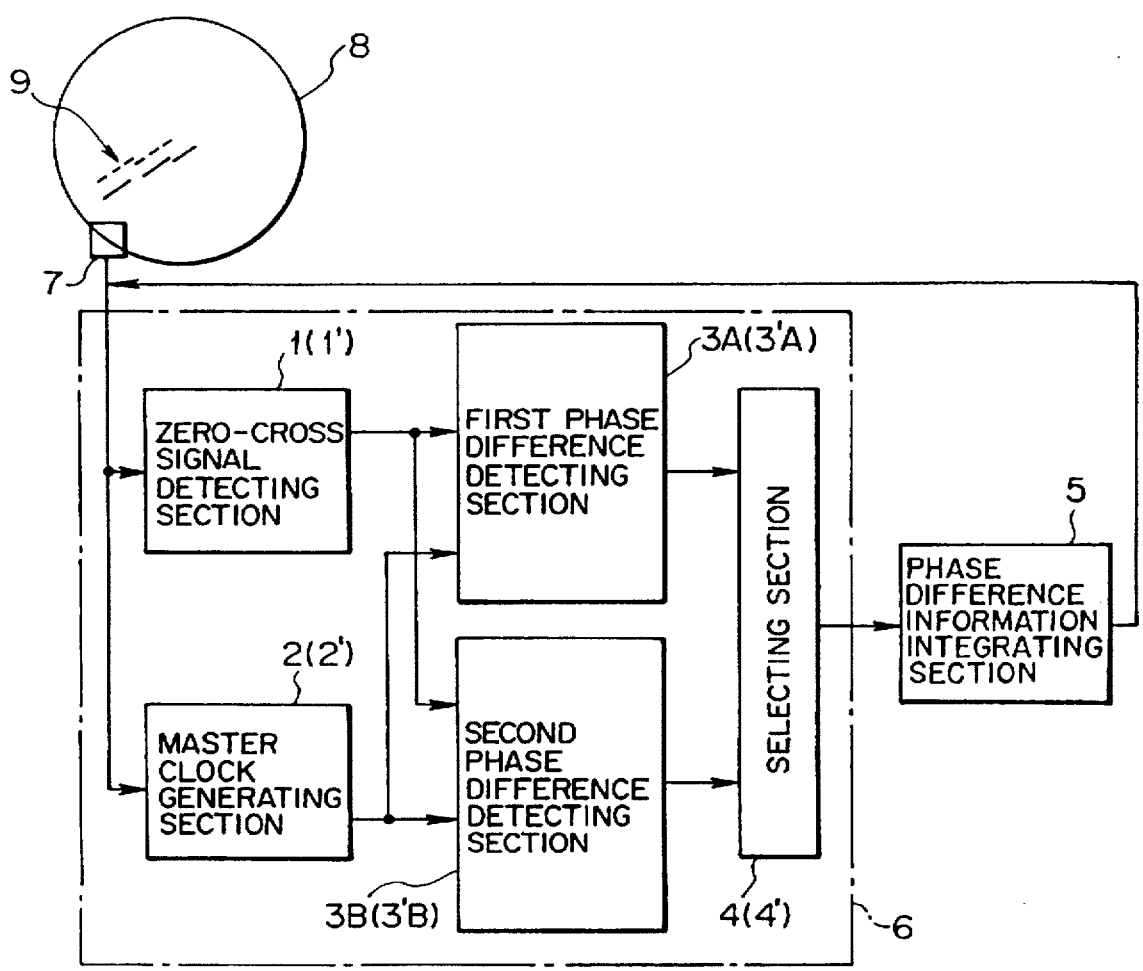
FIG. 1 is a block diagram showing an aspect of the present invention.

FIG. 1 is a block diagram showing the aspect of the present invention. In a disk apparatus shown in FIG. 1, different polarity information items are alternately recorded on a disk medium 8 in a circumferential direction thereof, thereby forming a plurality of servo patterns 9. The servo patterns 9 are sequentially recorded on the disk medium 8, in a radial direction, with a predetermined phase difference with respect to each other, so that the servo patterns 9 correspond to the respective cylinders. The positioning of a head 7 used for reading information from, or writing information to, the disk medium 8 is controlled on the basis of the servo patterns 9. To control the positioning of the above described head 7, the disk apparatus of the present invention is provided with a zero-cross signal detecting section 1, a master clock generating section 2, a first phase difference detecting section 3A, a second phase difference detecting section 3B, a selecting section 4, and a phase difference information integrating section 5.

The zero-cross signal detecting section 1 detects a zero-cross signal on the basis of the servo patterns 9, and the master clock generating section 2 generates a master clock based on the servo patterns 9.

The first phase difference detecting section 3A discriminates the different polarity information items contained in the servo patterns 9 from one another through use of the zero-cross signal detected by the zero-cross signal detecting section 1 and the master clock delivered from the master clock generating section 2 as well as the servo patterns 9 corresponding to N cylinders (N is an integer equal to or greater than 2). As a result, information on a phase difference between the reference phase of the master clock and detection timing of the servo patterns 9 obtained from the zero-cross signal is output from the first phase difference detection section 3A.

The second phase difference detecting section 3B outputs information on a phase difference between the reference phase of the master clock and the detection timing of the servo pattern 9 obtained from the zero-cross signal without discriminating the different polarity information items contained in the servo patterns 9 from one another, through use of the zero-cross signal detected by the zero-cross signal detecting section 1 and the master clock delivered from the master clock generating section 2.

The selecting section 4 outputs the phase difference information delivered from the first phase difference detecting section 3A when seek operation is performed but outputs the phase difference information delivered from the second phase difference detecting section 3B when on-track control is performed.

The phase difference information integrating section 5 integrates the phase difference information selected by the selecting section 4, and it then outputs a position control signal for controlling the positioning of the head 7.

The first phase difference detecting section 3A and the second phase difference detecting section 3B may be constituted as follows.

Specifically, the first phase difference detecting section 3A may be provided with a first flip-flop, a second flip-flop, and a first EXCLUSIVE-OR circuit which outputs, as phase difference information, the result of exclusive-OR operation on outputs from the first and second flip-flops. In this case, the master clock is input to the clock input terminal of the first flip-flop circuit, and the output of the second flip-flop is input to the data input terminal of the first flip-flop. Further, the zero-cross signal is input to the clock input terminal of the second flip-flop, and the output of the first flip-flop is input to the data input terminal of the second flip-flop.

The second phase difference detecting section 3B may be provided with a third flip-flop, a fourth flip-flop, a second EXCLUSIVE-OR circuit for performing exclusive-OR operation on outputs from the third and fourth flip-flops, a fifth flip-flop, a sixth flip-flop, a third EXCLUSIVE-OR circuit for performing exclusive-OR operation on outputs from the fifth and sixth flip-flops, and an AND circuit for performing AND operation on outputs from the second and third EXCLUSIVE-OR circuits. In such a case, the master clock is input to the clock input terminal of the third flip-flop, and the output of the fourth flip-flop is input to the data input terminal of the third flip-flop. The zero-cross signal is input to the clock input terminal of the fourth flip-flop, and the output of the third flip-flop is input to the data input terminal of the fourth flip-flop. Further, the master clock is input to the clock input terminal of the fifth flip-flop, and the output of the sixth flip-flop is input to the data input terminal of the fifth flip-flop. An inverted zero-cross signal is input to the clock input terminal of the sixth flip-flop, and the output of the fifth flip-flop is input to the data input terminal of the sixth flip-flop.

A phase demodulating device 6 is used in the disk apparatus in which different polarity information items are alternately recorded on the disk medium 8 in a circumferential direction thereof, so as to form the plurality of servo patterns 9, and these servo patterns 9 are sequentially recorded on the disk medium 8 in a radial direction thereof with a predetermined phase difference with respect to each other, so that the servo patterns 9 correspond to the respective cylinders. The phase demodulating device 6 is made up of a zero-cross signal detecting section 1', a master clock generating section 2', a first phase difference detecting section 3'A, a second phase difference detecting section 3'B, and a selecting section 4'.

The zero-cross signal detecting section 1' detects a zero-cross signal corresponding to each of the polarity information items contained in the servo patterns 9, and the master clock generating section 2' generates a master clock on the basis of the servo patterns 9.

The first phase difference detecting section 3' outputs information on a phase difference between the reference phase of the master clock and detection timing of the servo pattern 9 produced from a zero-cross signal corresponding to any one of the polarity information items. The second phase difference detecting section 3'B outputs information on a phase difference between the reference phase of the master clock and detection timing of the servo pattern 9 produced from a zero-cross signal corresponding to each polarity information.

The selecting section 4' selectively outputs either the phase difference information delivered from the first phase difference detecting section 3'A or the phase difference information delivered from the second phase difference detecting section 3'B.

With the above-described structure, the disk apparatus and the phase demodulating device 6 for the disk apparatus of the present invention can operate as follows. In the drive disk, a plurality of servo patterns 9, each including different polarity information items alternately recorded in the circumferential direction of the disk medium 8, are sequentially recorded on the disk medium 8 in a radial direction thereof with a predetermined phase difference with respect to each other, so as to correspond to the respective cylinders, and the positioning of the head 7 used for reading data from, or writing data onto, the disk medium 8 is controlled on the basis of the servo patterns 9. In a predetermined control state, the different polarity information items contained in the servo patterns 9 are discriminated from one another through use of the servo patterns 9 corresponding to N cylinders (N is an integer equal to or greater than 2), and phase demodulation is carried out for controlling the positioning of the head 7 used for reading data from, or writing data to, the disk medium 8. In another control state different from the predetermined control state, half the servo patterns 9 corresponding to N cylinders are used, and phase demodulation is carried out for controlling the positioning of the head 7 without discriminating the different polarity information contained in the servo patterns 9 from one another.

More specifically, in the disk apparatus and the phase demodulating device 6 for use in the disk apparatus of the present invention, when the head 7 undergoes seek operation, the different polarity information items contained in the servo patterns 9 are discriminated from one another through use of the servo patterns 9 corresponding to N cylinders, and the phase demodulation is carried out for controlling the positioning of the head 7. On the other hand, when the head 7 undergoes on-track control, half the servo patterns 9 corresponding to N cylinders are used, and the phase demodulation is carried out for controlling the positioning of the head 7 without discriminating the different polarity information items contained in the servo patterns 9 from one another.

In the disk apparatus of the present invention, the selecting section 4 outputs the phase difference information delivered from the first phase difference detecting section 3A when seek operation is performed. On the other hand, it outputs the phase difference information delivered from the second phase difference detecting section 3B when on-track control is performed. Therefore, the positional signal can be demodulated through use of a suitable method depending on whether the disk apparatus is in the process of a seek operation, which require a high speed, or in the process of on-track control, which requires a position detection accuracy, thereby contributing to improvements in the reliability of the disk apparatus.

In the phase demodulating device 6 for use in the disk apparatus of the present invention, the selecting section 4 selectively outputs the phase difference information delivered from the first phase detecting section 3A and the phase difference information delivered from the second phase detecting section 3B. As a result, the positional signal can be demodulated through use of a suitable method depending on whether the disk apparatus is in the process of a seek operation, which require a high speed, or in the process of on-track control, which requires a position detection accuracy, thereby contributing to improvements in the reliability of the disk apparatus.

According to the phase demodulating method for the disk apparatus of the present invention, phase demodulation is carried out for controlling the positioning of the head 7, which reads data, or writes data to, the disk medium 8, without discriminating the different polarity information items contained in the servo patterns 9 from one another through use of the servo patterns 9 corresponding to N cylinders (N is an integer equal to or greater than 2) in a predetermined control state. In another control state differing from the predetermined control state, half the servo patterns 9 corresponding to N cylinders are used, whereby the different polarity information items contained in the servo patterns 9 are discriminated from one another. Then, phase demodulation is carried out for controlling the positioning of the head 7. As a result, the positional signal can be demodulated through use of a suitable method depending on whether the disk apparatus is in the process of a seek operation, which require a high speed, or in the process of on-track control, which requires a position detection accuracy, thereby contributing to improvements in the reliability of the disk apparatus.

In the phase demodulating method for the disk apparatus of the present invention, when the head 7 undergoes seek operation, the servo patterns 9 corresponding to N cylinders are used, and phase demodulation is carried out for controlling the positioning of the head 7 without discriminating the different polarity information items contained in the servo patterns 9 from one another. When the head 7 undergoes on-track control, half the servo patterns 9 corresponding to N cylinders are used, whereby the different polarity information items contained in the servo patterns 9 are discriminated from one another. Phase demodulation is carried out for controlling the positioning of the head 7. As a result, the positional signal can be demodulated through use of a suitable method depending on whether the disk apparatus is in the process of a seek operation, which requires a high speed, or in the process of on-track control, which requires a position detection accuracy, thereby contributing to improvements in the reliability of the disk apparatus.

(b) Embodiment of the Invention

A disk apparatus according to an embodiment of the present invention will now be described with reference to the accompanying drawings.

Figure 2:
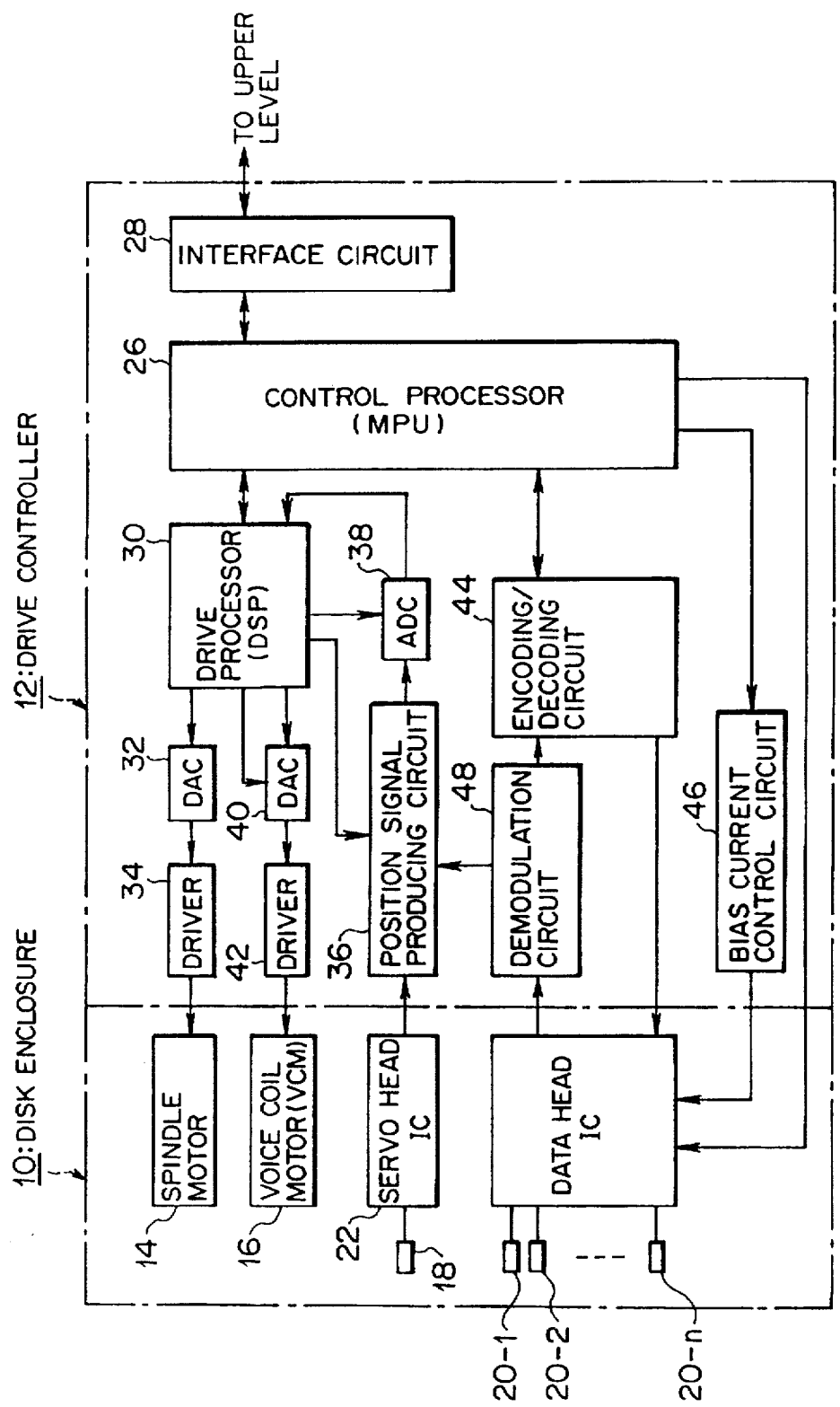
FIG. 2 is a block diagram showing the overall structure of a disk apparatus according to an embodiment of the present invention.

FIG. 2 is a block diagram showing the overall structure of a disk apparatus according to the embodiment of the present invention.

The disk apparatus shown in FIG. 2 adopts a servo-plane servo system. For example, as shown in an upper part of FIG. 8, N-polarity information and S-polarity information are alternately recorded on a servo plane of a disk medium of the disk apparatus in a circumferential direction of the disk medium, thereby forming a plurality of servo patterns. The servo patterns are sequentially recorded on the disk medium in a radial direction with a predetermined phase difference with respect to each other so as to correspond to the respective cylinders. In the disk apparatus shown in FIG. 2, the positioning of a head which reads data from, or write data to, the disk medium is controlled by detecting the servo patterns.

The disk apparatus shown in FIG. 2 is composed of a disk enclosure 10 and a drive controller 12.

The disk enclosure 10 is provided with a spindle motor 14 for rotating the disk, and a voice coil motor (VCM) 16 for moving the head.

The disk enclosure 10 is provided with a servo head 18 and a servo head IC 22 for reading information from the servo plane of the magnetic disk.

The disk enclosure 10 is further provided with data heads 20-1 to 20-n and a data head IC 24 for reading data from, or writing data to, a plurality of data planes. Each of the data heads 20-1 to 20-n is provided with a write head and a read head which are integrated together. A magnetic head is used as the write head, and an MR head using a magnetic resistance element is used as the read head.

The drive controller 12 is provided with a control processor (MPU) 26 for effecting the overall control of the disk apparatus. The control processor 26 is connected to a higher-level disk control unit via an interface circuit 28. Upon receipt of a variety of commands, such as a seek command, a read command, and a write command, from the disk control unit, the control processor 26 executes processing corresponding to the command.

A drive processor 30 which controls the positioning of the head is placed under control of the control processor 26. A digital signal processor (DSP) is used for the drive processor 30 (hereinafter often referred to as a DSP 30).

A positional signal producing circuit 36 is provided for detecting the head position which is used in the drive processor 30. The signal read by the servo head 18 is input to the positional signal producing circuit 36. In the present embodiment, an AD converter (ADC) 38 converts the positional signal delivered from the positional signal producing circuit 36 into digital data. The positional signal is obtained as a result of reading phase servo information recorded on the servo plane of the disk medium. The converted digital data are then input to the drive processor 30.

Upon receipt of the positional signal from the positional signal producing circuit 36, the drive processor 30 controls the positioning of the head by actuating the VCM 16 via a DA converter (DAC) 40 and a driver 42, as well as controlling a spindle motor 14 via a DA converter (DAC) 32 and a driver 34.

The head positioning control carried out by the drive processor 30 comprises seek control for moving the head to a target cylinder in accordance with the seek command and ontrack control which is effected after the head has arrived at the target cylinder so as to maintain the head at the target track.

The seek control comprises coarse control and fine control. The coarse control is to move the head to the position immediately before a target cylinder according to a target speed pattern, while the fine control is to switch speed control to position servo control when the head arrives at the position immediately before the target cylinder, e.g., 0.5 cylinder before the target cylinder. As a result, the head is brought into the target cylinder.

An encoding/decoding circuit 44, a demodulation circuit 48, and a bias-current control circuit 46 are disposed in order to read data from, or write data to, the data plane of the disk medium. Known circuitry can be used for these read/write circuits.

Phase servo patterns (not shown) which are equivalent to the phase servo patterns recorded on the servo plane are recorded on the data plane of the disk medium.

To detect the head position, the phase servo patterns recorded on the data plane are read by read heads disposed on the data heads 20-1 to 20-n. The signal read by the read heads is fed to the positional signal producing circuit 36 via the data head IC 24 and the demodulation circuit 48.

Figure 3:
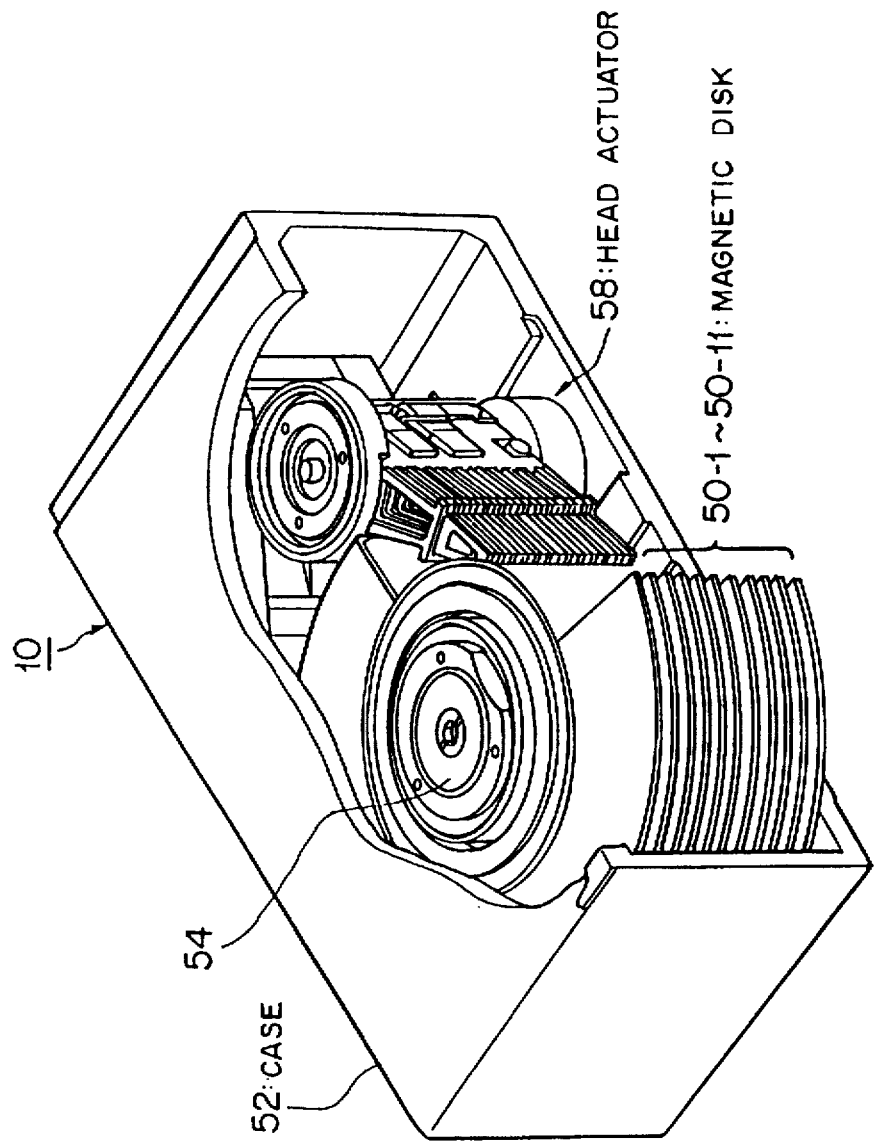
FIG. 3 is a partially cut-away view of a disk enclosure of the disk apparatus according to the embodiment shown of the present invention.

FIG. 3 is a partially cut-away view of a disk enclosure 10 of the disk apparatus according to the embodiment shown in FIG. 2.

In FIG. 3, eleven magnetic disks 50-1 to 50-11 are housed in a case 52 of the disk enclosure 10 so as to be rotatively supported by a rotary shaft 54. The magnetic disks are rotated by a spindle motor (not shown) disposed below the case 52.

A head actuator 58 is disposed on the right of the magnetic disks 50-1 to 50-11. The heads provided at the tip end of the head actuator 58 can be moved simultaneously along the disk medium plane of each of the magnetic disks 50-1 to 50-11 in the radial direction thereof.

Twenty heads are provided with respect to the eleven magnetic disks 50-1 to 50-11 in the present embodiment. The upper nine heads are data heads 20-1 to 20-9 followed by a servo head 18. The remaining ten heads subsequent to the servo head 18 are data heads 20-10 to 20-19.

The disk medium planes of the magnetic disks 50-1 to 50-11 which are opposite to the data heads 20-1 to 20-19 serve as data planes onto which data are written. The upper disk medium plane of the magnetic disk 50-6 on which the servo head 18 is placed serves as a servo plane. Servo information is recorded in all the tracks of the servo plane. If the servo plane is located at the longitudinal center of the stacked magnetic disks 50-1 to 50-11, the distances from the servo plane to the distal end magnetic disks 50-1 and 50-11 become minimum. As a result, an offset on each data plane, i.e., positional variations on the data plane with respect to the servo plane, caused as a result of mechanical deformation due to temperature variations is minimized. For this reason, the disk medium plane of the magnetic disk 50-6 which faces the servo head 18 is used as the servo plane.

Figure 4:
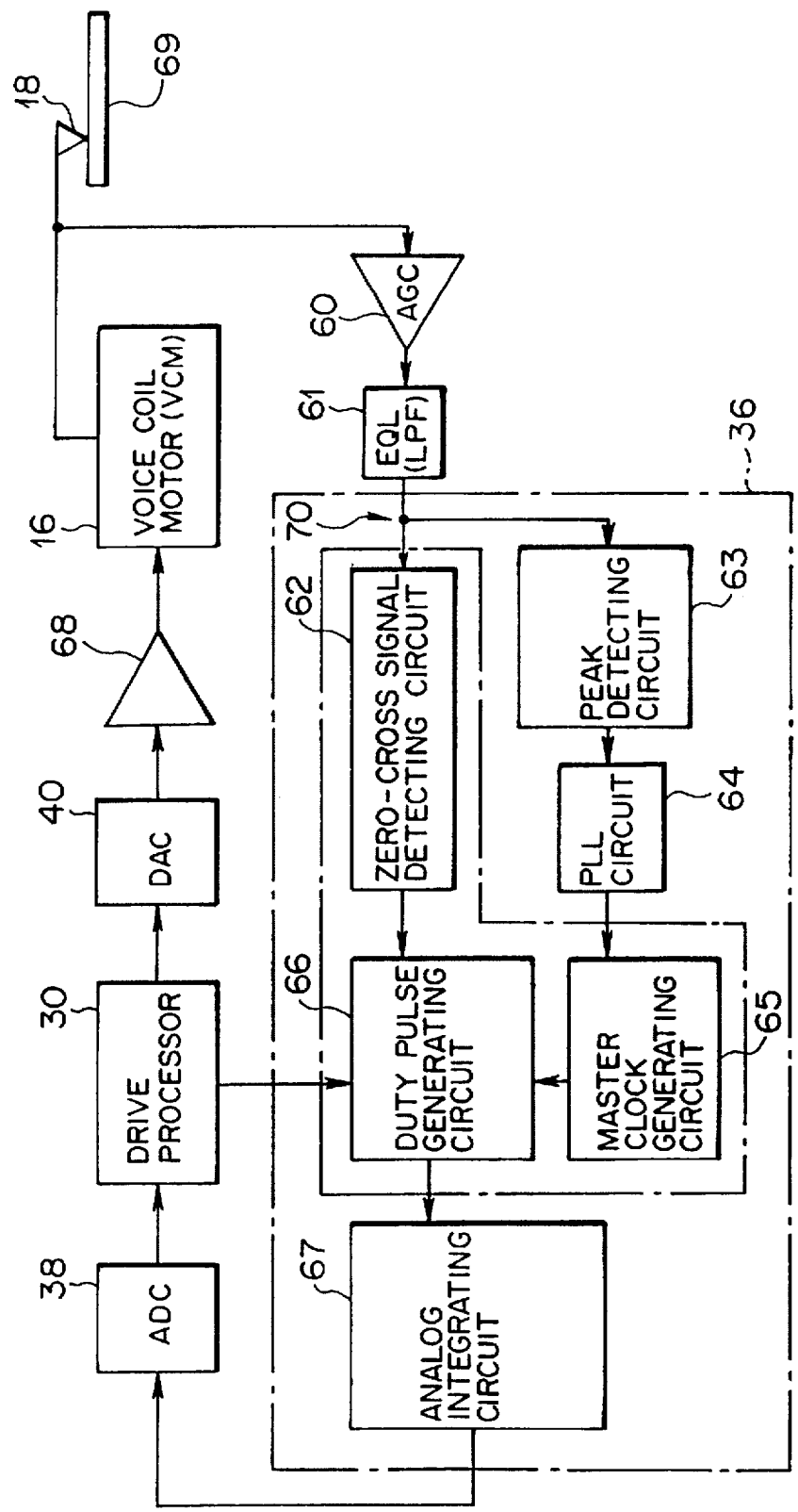
FIG. 4 is a block diagram showing the structure of a head positioning control circuit of the disk apparatus according to the embodiment of the present invention.
Figure 5:
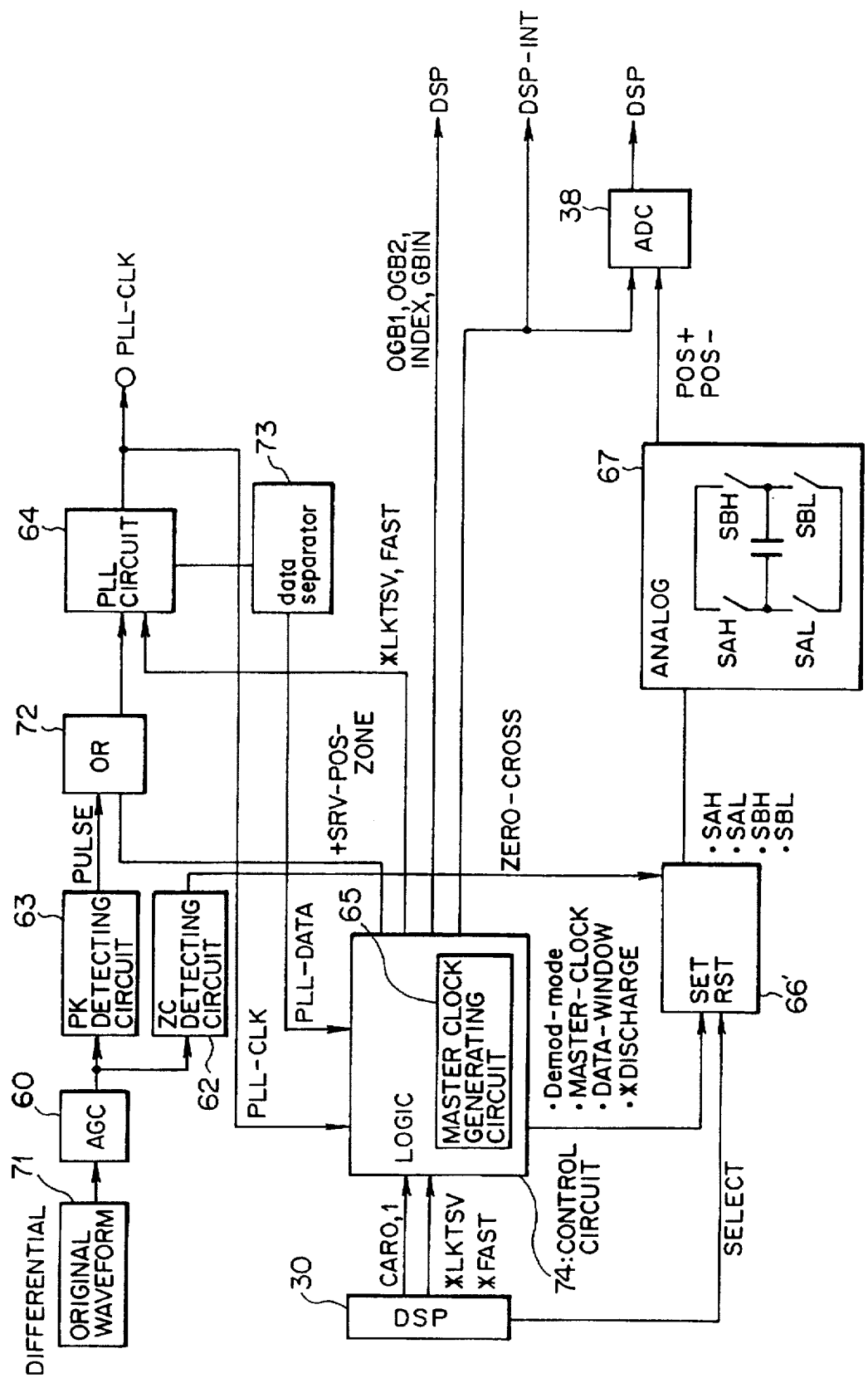
FIG. 5 is a block diagram showing the structure of a positional signal producing circuit.

FIG. 4 shows the structure of a head positioning control circuit for use in the disk apparatus according to the embodiment of the present invention. FIG. 5 shows the structure of the positional signal producing circuit 36 of the head positioning control circuit for use in the disk apparatus shown in FIG. 4. In FIGS. 4 and 5, components denoted by the same reference numerals as those used in FIG. 2 have the same or similar functions.

As shown in FIG. 4, a read-out signal representing the servo pattern detected by the head 18 is input to the positional signal producing circuit 36 via an AGC circuit 60 and an EQL 61. The AGC circuit 60 controls the amplitude of the readout signal to a certain level.

The positional signal producing circuit 36 produces a positional control signal used for controlling the positioning of the head 18. This positional signal producing circuit 36 is provided with a peak detecting circuit 63, a PLL circuit 64, a phase demodulating device 80 for the disk apparatus, and an analog integrator (a phase difference information integrating section) 67.

The read-out signal representing the servo pattern detected by the head 18 is provided to the peak detecting circuit 63 via a node 70. The peak detecting circuit 63 detects the peak of the read-out signal. Upon detection of the fact that a signal output from the AGC circuit 60 is above a certain level, and that a differentiated waveform is zero, the peak detecting circuit 63 outputs a peak pulse.

Figure 8:
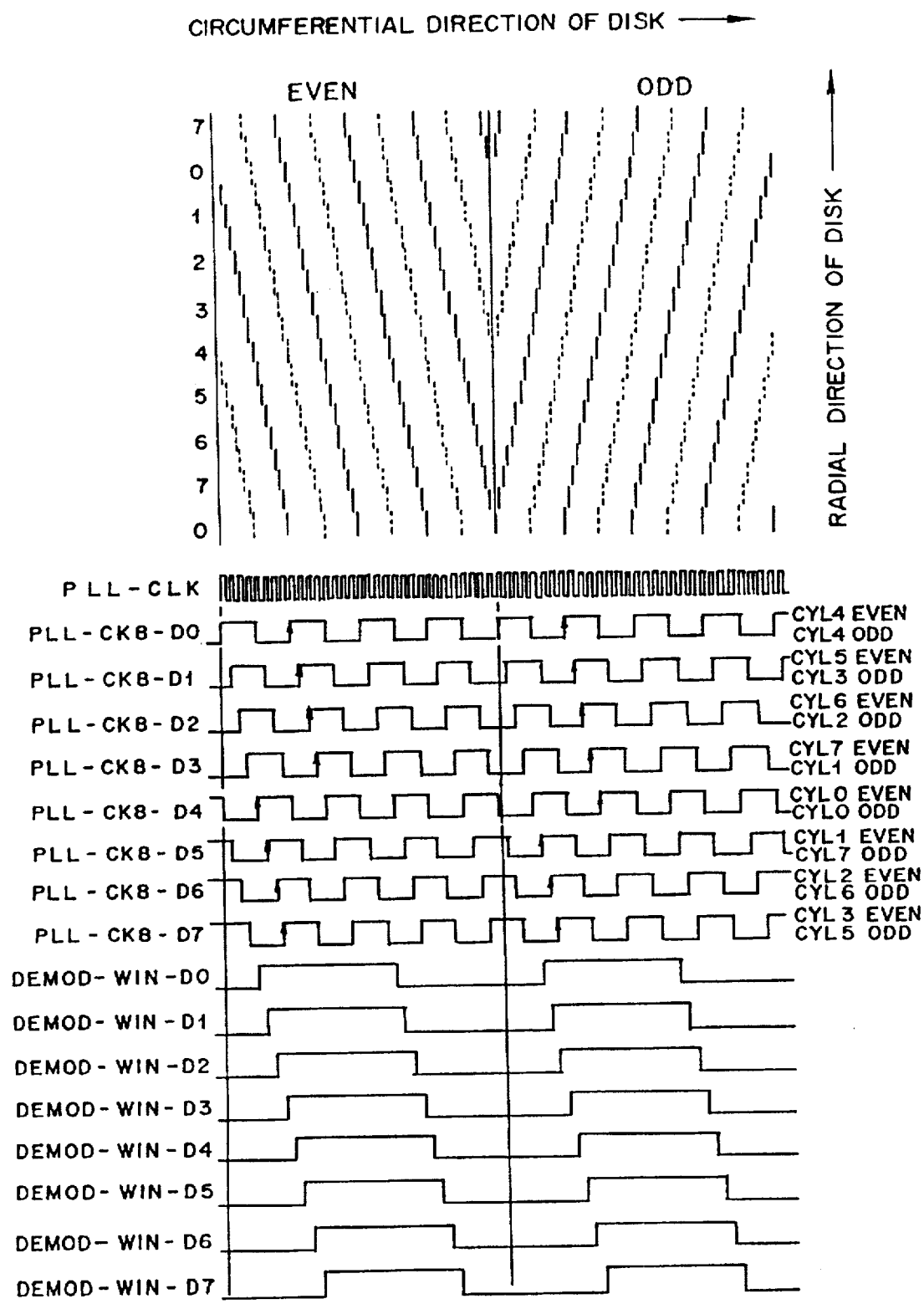
FIG. 8 is an explanatory chart for explaining servo demodulation in an eight-cylinder group.
Figure 12:
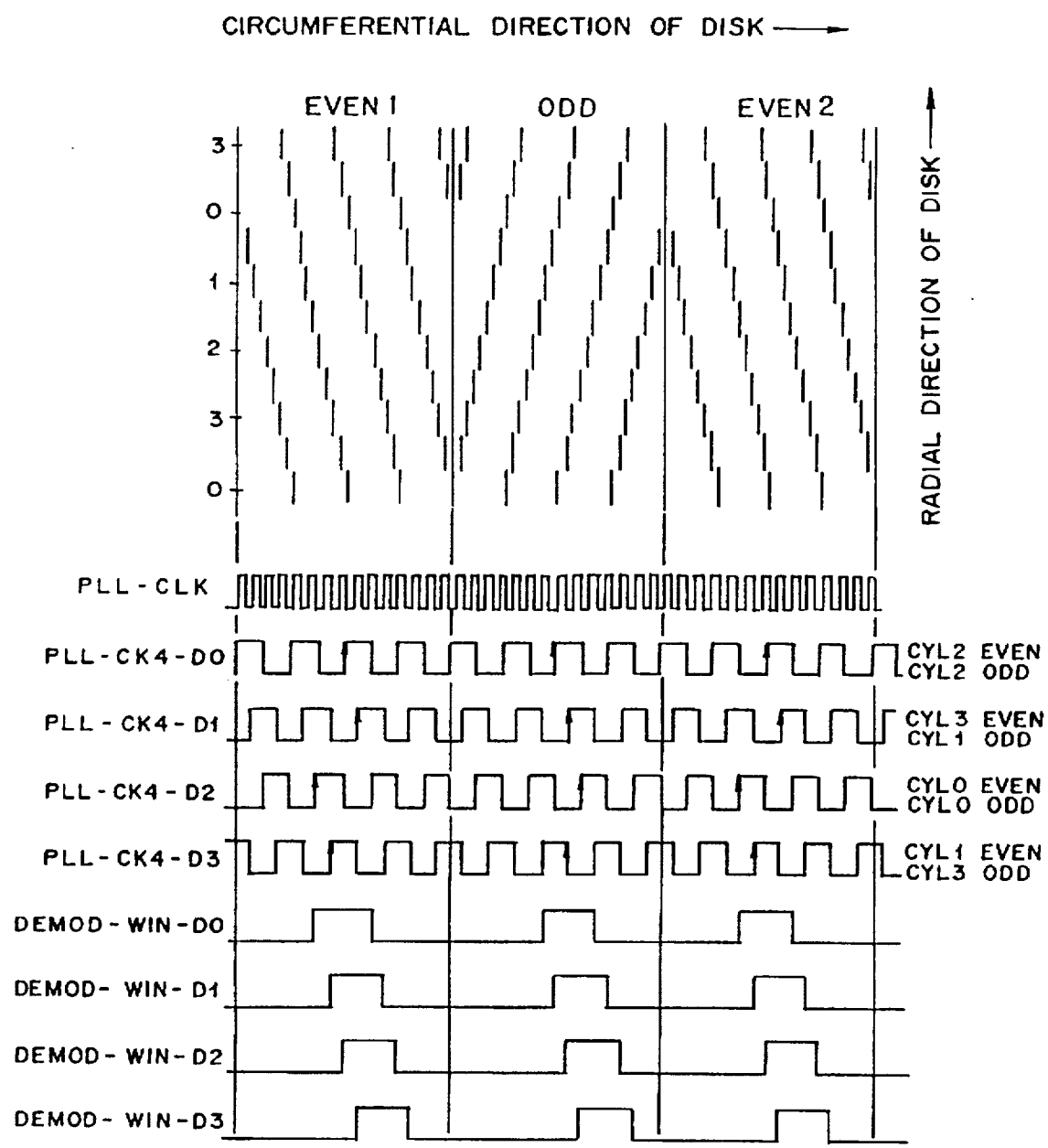
FIG. 12 is an explanatory chart for explaining servo demodulation in a four-cylinder group.

The PLL circuit 64 generates a PLL clock (a timing chart of this PLL clock, i.e., PLL-CLK, is shown in FIGS. 8 and 12) which is synchronized with the peak pulse output from the peak detecting circuit 63.

The phase demodulating device 80 generates duty pulses from the servo pattern signal detected by the head 18 and the PLL clock signal output from the PLL circuit 64. The phase demodulating device 80 is provided with a zero-cross signal detecting circuit (a zero-cross signal detecting section) 62, a master clock generating circuit (a master clock generating section) 65, and a duty pulse generating circuit 66.

The zero-cross signal detecting circuit 62 detects a zero-cross signal, as shown in FIGS. 8 and 12, from the read-out signal which represents the servo pattern detected by the head 18.

The master clock generating circuit 65 generates a master clock, as shown in FIGS. 8 and 12, from the servo pattern signal detected by the head 18.

With use of servo patterns corresponding to predetermined cylinders as well as the master clock generated from the zero-cross signal detected by the zero-cross signal detecting circuit 62 and the master clock generated by the master clock generating circuit 65, the duty pulse generating circuit 66 generates duty pulses (timing charts of the duty pulses are shown in FIGS. 8 and 12) which is information on a phase difference between the reference phase of the master clock and detection timing of the servo pattern produced from the zero-cross signal. The duty pulse generating circuit 66 is provided with a first phase difference detecting section, a second phase difference detecting section, and a selecting section which will be described later.

The analog integrating circuit 67 integrates the duty pulses generated by the duty pulse generating circuit 66 and then outputs a position control signal which has a magnitude corresponding to the phase difference used for controlling the position of the head 18.

Figure 7:
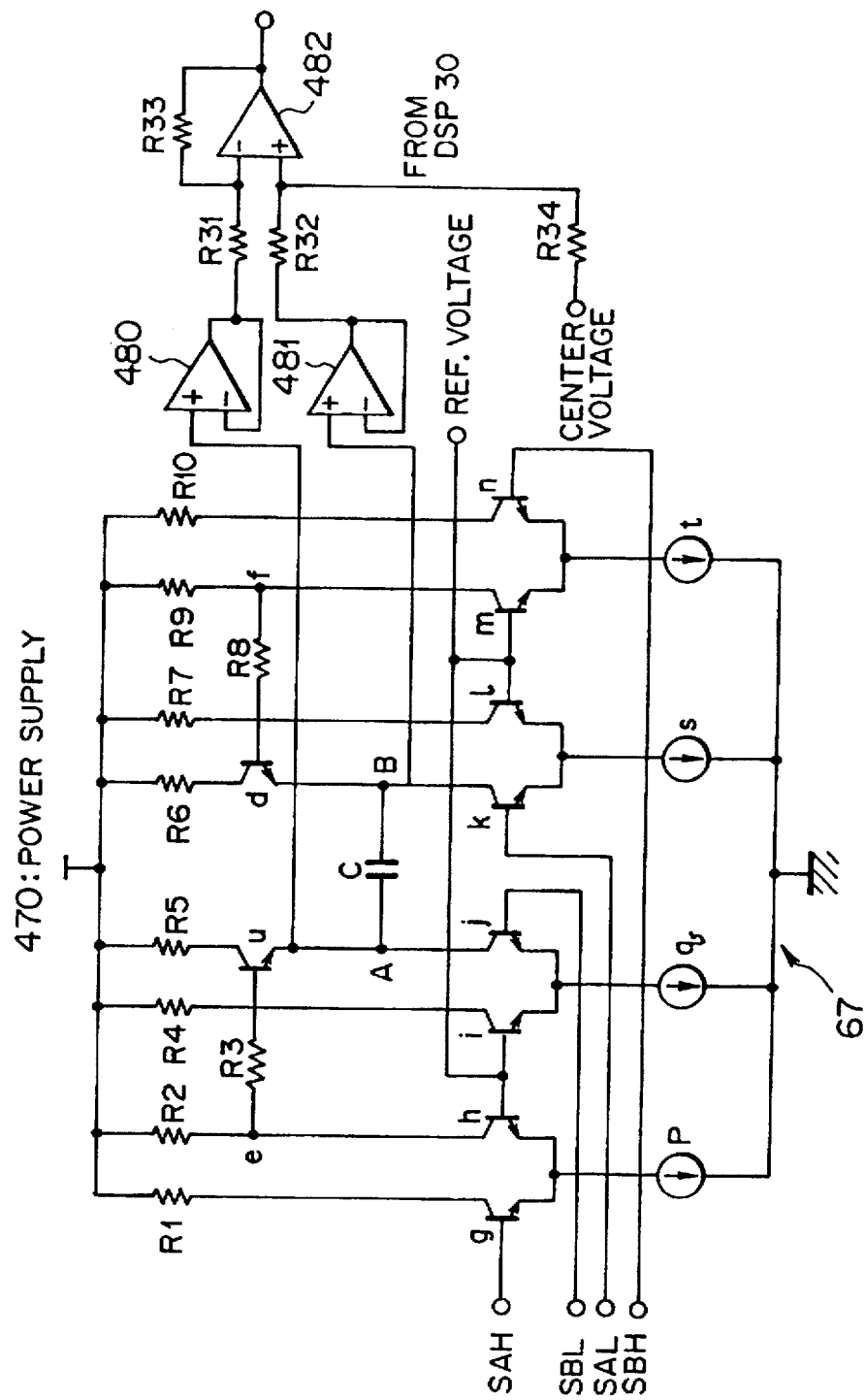
FIG. 7 is a diagram showing the structure of an analog integrating circuit.

As shown in FIG. 7, the analog integrating circuit 67 is provided with a power source 470, voltage-follower type operational amplifiers (OP-amps) 480 and 481, a differential amplifier 482, resistors R1 to R10 and R31 to R34, current switches (transistors) g, h, i, j, k, l, m, and n, constant-current sources p, q, s, and t, and transistors u and d. With this arrangement, when the servo head reads out information from the servo region, the analog integrating circuit 67 carries out integration in which an electrical current is charged to such an extent as to correspond to the head position. The analog integrating circuit 67 discharges the electrical current before carrying out the next integration. More detailed operation of the analog integrating circuit is disclosed in Japanese Patent Application Laid-Open No. 6-243574, and hence an explanation therefor will be omitted here.

In this way, the position control signal output from the positional signal producing circuit 36 is input to the head 18 via the AD converter 38, the drive processor 30, the DA converter 40, the amplifier 68, and the VCM 16. As a result, the positioning of the head 18 is controlled. Numeral 69 denotes a disk medium.

The positional signal producing circuit 36 shown in FIG. 4 will now be described referring to FIG. 5. As previously described, components denoted by the same reference numerals as those used in FIGS. 2 and 4 have the same or similar functions.

A differential circuit 71 converts the output from the head 18, shown in FIG. 4, into a differential output. An OR circuit 72 prohibits a peak pulse (a readout pulse) from being output to the PLL circuit 64 through use of a servo zone period signal SRV-POS-ZONE delivered from a control circuit 74 which will be described later.

A data separator 73 causes the readout pulse output from the OR circuit 72 to synchronize with the clock PLL-CLK output from the PLL circuit 64, whereby PLL synchronization data PLL-DATA are output.

The control circuit 74 generates a demode-mode signal and a discharge instruction signal DISCHARGE based on the PLL synchronization data PLL-DATA output from the data separator 73 and the clock PLL-CLK output from the PLL circuit 64. The demode-mode signal controls the direction of current flow in the analog integrating circuit 67. The discharge instruction signal DISCHARGE causes the analog integrating circuit 67 to discharge. Further, on the basis of two bits of cylinder designation signals CAR 0, 1 output from the DSP 30, the control circuit 74 selects any one of a plurality of phase master clocks generated by the master clock generating circuit 65 in the control circuit 74. As a result, any one of the signals (the demode-mode signal Demod-mode, the discharge instruction signal DISCHARGE, and the master clock MASTER-CLK) is output to a set/reset circuit 66' which will be described latter. Consequently, the generation of the duty pulses in the set/reset circuit 66' is controlled.

The control circuit 74 generates the servo zone period signal SRV-POS-ZONE, and the thus generated signal is output to the OR circuit 72, which in turn prohibits the OR circuit 72 from outputting the peak pulse (the readout pulse) to the PLL circuit 64.

The control circuit 74 generates OGB1, OGB2, and an index signal INDEX from the PLL synchronization data PLL-DATA output from the data separator 73 and the clock signal PLL-CLK output from the PLL circuit 64. These signals are output to the unillustrated main control circuit (i.e., DSP).

The control circuit 74 controls the AD converter 38 by generating the servo zone signal on the basis of the PLL synchronization data PLL-DATA.

The set/reset circuit 66' has the same function as the duty pulse generating circuit 66 shown in FIG. 4 (hereinafter the set/reset circuit 66' and the duty pulse generating circuit 66 are often dealt with as being equivalent to each other). The set/reset circuit 66' generates duty pulses having a pulse width corresponding to a phase difference between the master clock MASTER-CLK output from the control circuit 74 and the zero-cross signal ZERO-CROSS output from the zero-cross detecting circuit 62.

Further, the set/reset circuit 66' generates operation signals SAH, SAL, SBH, and SBL used for operating the analog integrating circuit 67 on the basis of the demode-mode signal Demod-mode. The set/reset circuit 66' also generates operation signals SAH, SAL, SBH, and SBL used for discharging the analog integrating circuit 67 on the basis of the discharge instruction signal DISCHARGE. To discharge the analog integrating circuit 67, all the operation signals SAH, SAL, SBH, and SBL are brought to a high level.

Specifically, the phase demodulating device 80 shown in FIG. 4 is composed of the zero-cross signal detecting circuit 62, the master clock generating circuit 65 included in the control circuit 74, and the set/reset circuit 66', as shown in FIG. 5.

Figure 6:
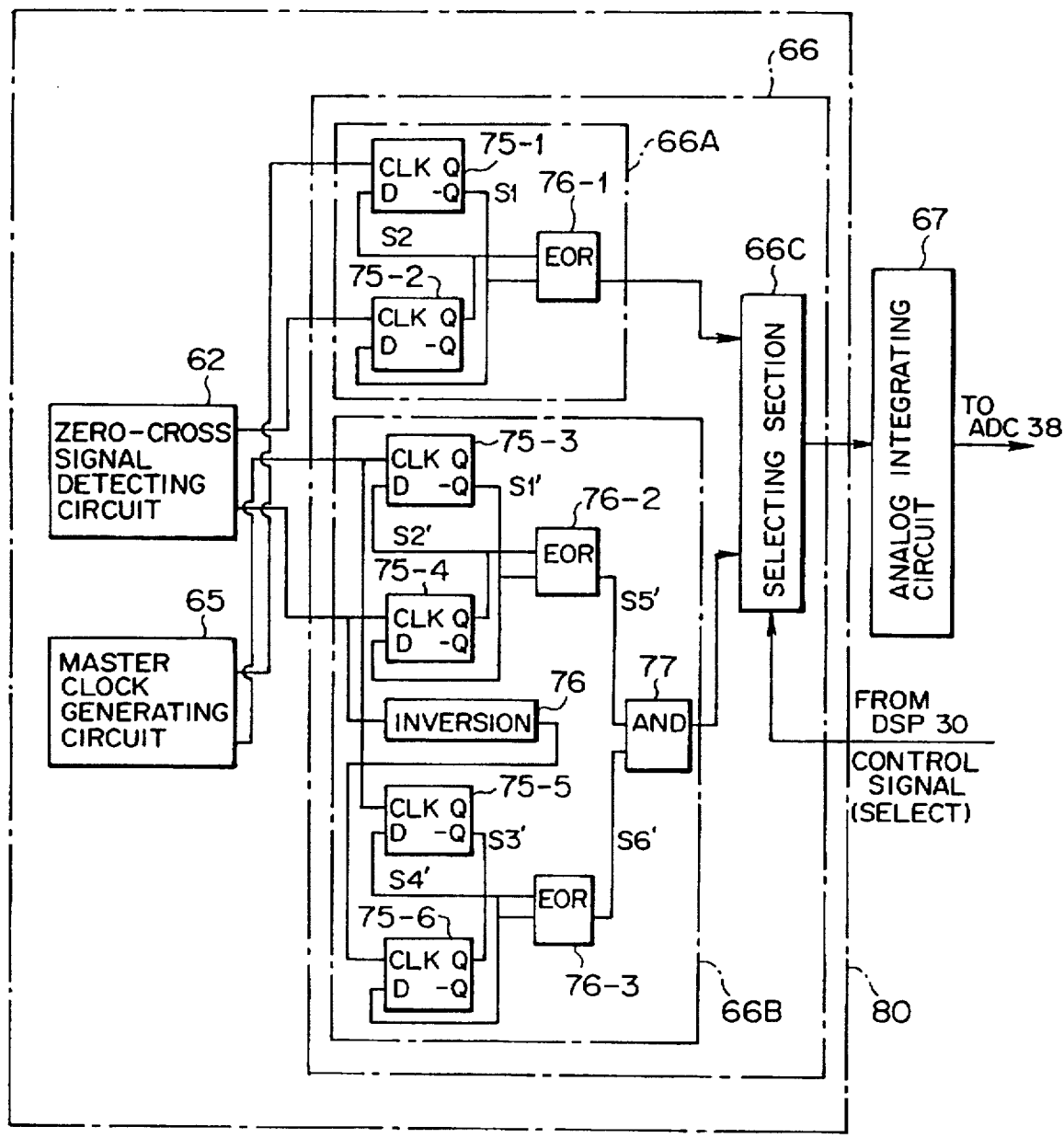
FIG. 6 is a block diagram showing the structure of the phase demodulating device of the disk apparatus according to the embodiment of the present invention.

FIG. 6 is a block diagram showing the structure of the phase demodulating device 80 shown in FIG. 4 according to the embodiment of the present invention.

As shown in FIG. 6, the phase demodulating device 80 is provided with the zero-cross signal detecting circuit (the zero-cross signal detecting section) 62, the master clock generating circuit (the master clock generating section) 65, the duty pulse generating circuit 66, and the analog integrating circuit (the phase difference information integrating section) 67. The functions of these elements have already been described.

As previously described, the duty pulse generating circuit 66 is provided with a first phase different detecting section 66A, a second phase difference detecting section 66B, and a selecting section 66C.

With use of servo patterns corresponding to N cylinders (N is an integer equal to or greater than 2) (i.e., servo patterns corresponding to eight cylinders in the present embodiment) as well as the zero-cross signal detected by the zero-cross signal detecting circuit 62 and the master clock output from the master clock generating circuit 65, the first phase difference detecting section 66A discriminates different polarity information items contained in the servo patterns from one another. Thus, the first phase difference detecting section 66A outputs information on the phase difference between the reference phase of the master clock and the detection timing of the servo pattern produced from the zero-cross signal.

In other words, the first phase difference detecting section 66A outputs the information on the phase difference between the reference phase of the master clock and the detection timing of the servo pattern produced from a zero-cross signal which corresponds to information on any one of the different polarities contained in the servo patterns.

In the present embodiment, the first phase difference detecting section 66A outputs duty pulses serving as information on the phase difference between the reference phase of the master clock and the detection timing of the servo pattern produced from the zero-cross signal, through use of only polarity information on any one of the polarities N and S contained in the servo patterns corresponding to eight cylinders (hereinafter often referred to as an 8-cylinder group).

In order to cope with a high-speed seek operation of the head, the first phase difference detecting section 66A uses an 8-cylinder group servo pattern in which eight cylinders are grouped into one unit, instead of the use of a conventional four-cylinder group servo pattern in which four cylinders are grouped into one unit. If the servo signal is demodulated using the 4-cylinder group servo patterns, servo patterns corresponding to three cylinders can only be demodulated. In contrast, if the servo signal is demodulated using the 8-cylinder group servo patterns, servo patterns corresponding to seven cylinders can become demodulated. Consequently, it is possible to detect the positional signal even when the head undergoes the seek operation at high speed.

There are two methods of grouping the servo patterns for every eight cylinders. Specifically, one method is to group the servo patterns for every eight cylinders by reducing the density of the servo patterns in the direction of a track (i.e., by increasing a track pitch), using polarity information on both the magnetic polarities N and S contained in the servo patterns. Another method is to group the servo patterns for every eight cylinders by spuriously reducing the density of the servo patterns in the direction of the track, using only information on either the magnetic polarity N or the magnetic polarity S contained in the servo patterns. In the present embodiment, the servo patterns grouped every eight cylinders using the latter method which does not practically change the density of the servo patterns in the direction of the track.

Figure 11:
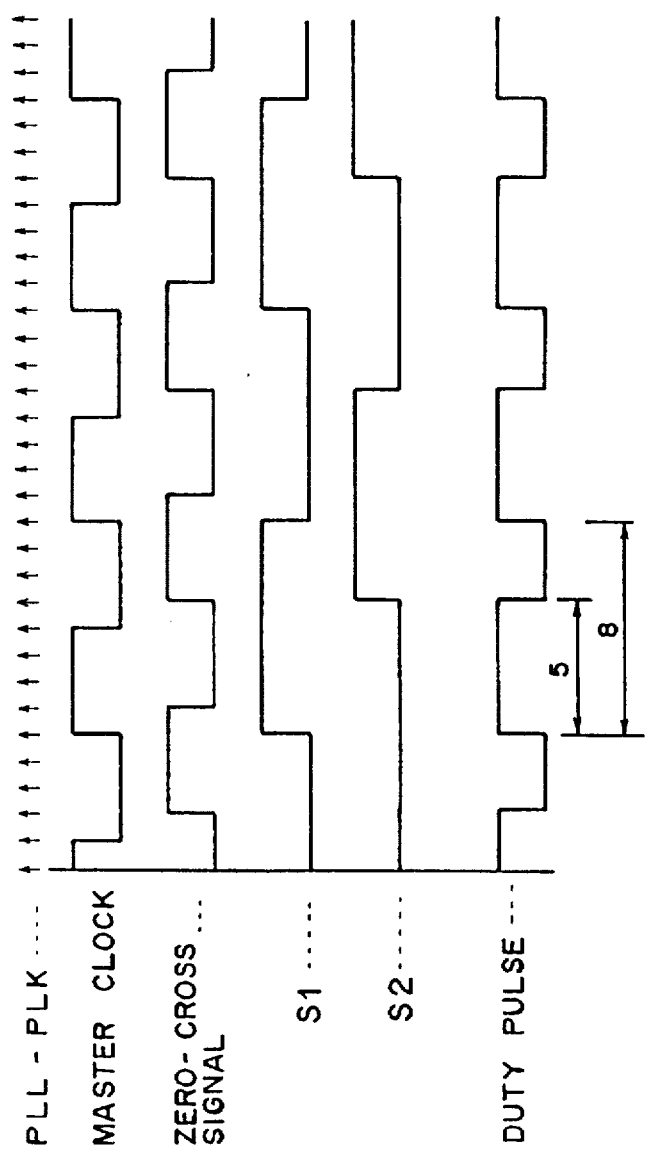
FIG. 11 is a time chart illustrating servo demodulation performed using servo patterns in the eight-cylinder group.

Specifically, the first phase difference detecting section 66A is composed of a flip-flop (a first flip-flop) 75-1, a flip-flop (a second flip-flop) 75-2, and an EXCLUSIVE OR circuit (a first EXCLUSIVE OR circuit) 76-1 which outputs phase difference information by performing exclusive-OR operation on outputs S1 and S2 (timing charts of these outputs S1 and S2 are shown in FIG. 11) of the flip-flops, as shown in FIG. 6. The master clock is input to the clock input terminal of the flip-flop 75-1, and the output S2 of the flip-flop 75-2 is input to the data input terminal of the flip-flop 75-1. The zero-cross signal is input to the clock input terminal of the flip-flop 75-2, and the output S1 of the flip-flop 75-1 is input to the data input terminal of the flip-flop 75-2.

With use of half the servo patterns corresponding to N cylinders (servo patterns corresponding to four cylinders in the present embodiment) as well as the zero-cross signal detected by the zero-cross signal detecting circuit 62 and the master clock output from the master clock generating circuit 65, the second phase difference detecting section 66B outputs duty pulses serving as information on the phase difference between the reference phase of the master clock and the detection timing of the servo pattern produced from the zero-cross signal, without discriminating information on the different polarities contained in the servo patterns from one another.

Specifically, the second phase difference detecting section 66B outputs information on the phase difference between the reference phase of the master clock and the detection timing of the servo patterns produced from the zero-cross signals which correspond to different polarity information items (i.e., each of polarity information items) contained in the servo patterns.

In the present embodiment, with use of polarity information on both magnetic polarities N and S in the servo patterns corresponding to four cylinders (they are often called a 4-cylinder group) as well as the zero-cross signal and the master clock, the second phase difference detecting section 66B outputs information on the phase difference between the reference phase of the master clock and the detection timing of the servo pattern produced from the zero-cross signal.

As previously described, the first phase difference detecting section 66A uses the 8-cylinder group servo patterns in order to cope with the high-speed seek operation of the head in the present embodiment. However, if the servo signal is demodulated using the 8-cylinder group servo patterns, the number of pulses used in the integrating operation is reduced, which in turn results in a drop in position detection accuracy.

To prevent this problem, in the present embodiment, the second phase difference detecting section 66B carries out phase demodulation, using the 4-cylinder group servo patterns in which four cylinders are grouped into one unit. As a result, the position detection accuracy is improved.

Figure 15:
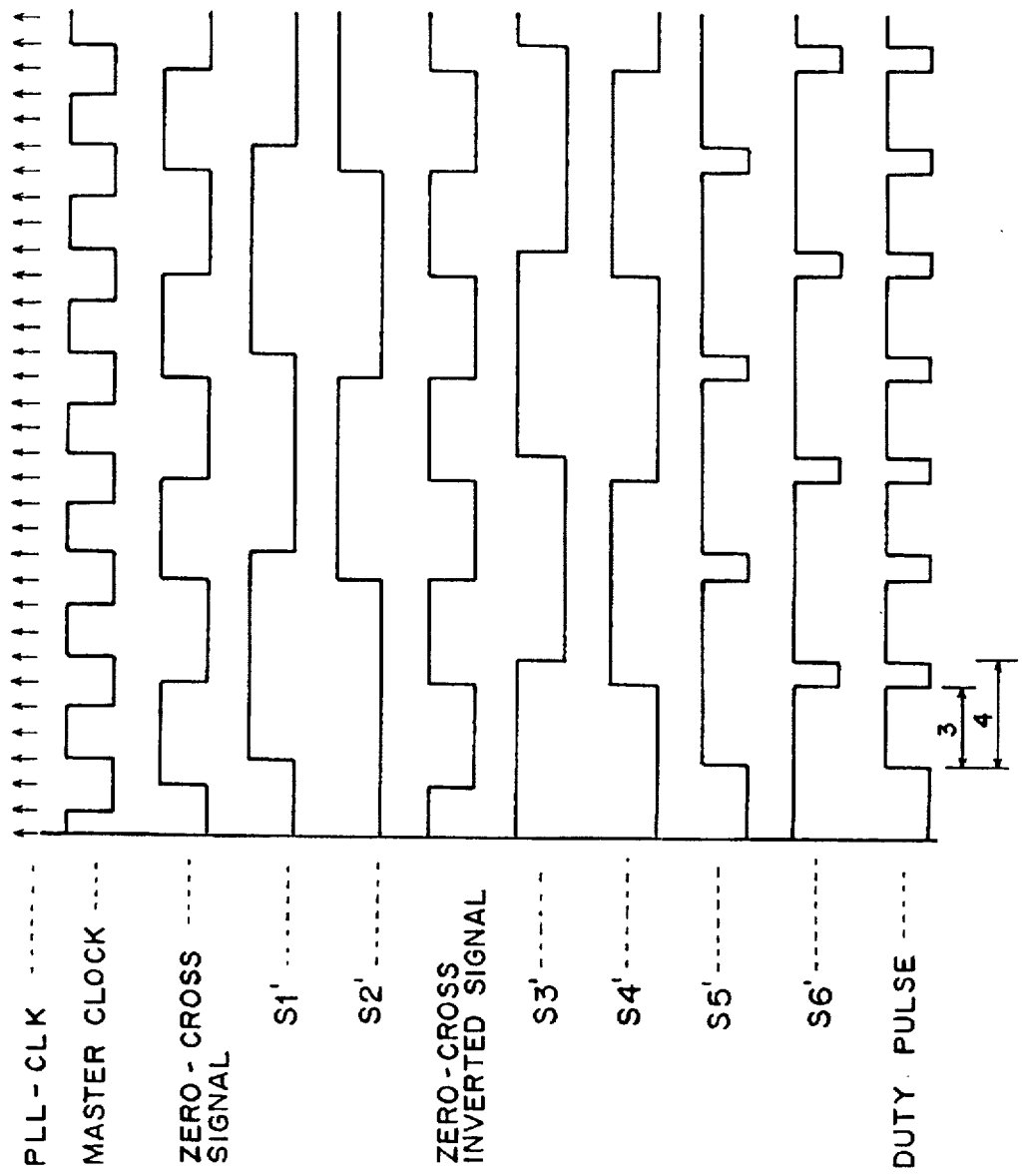
FIG. 15 is a time chart illustrating servo demodulation performed using servo patterns in the four-cylinder group.
Figure 16:
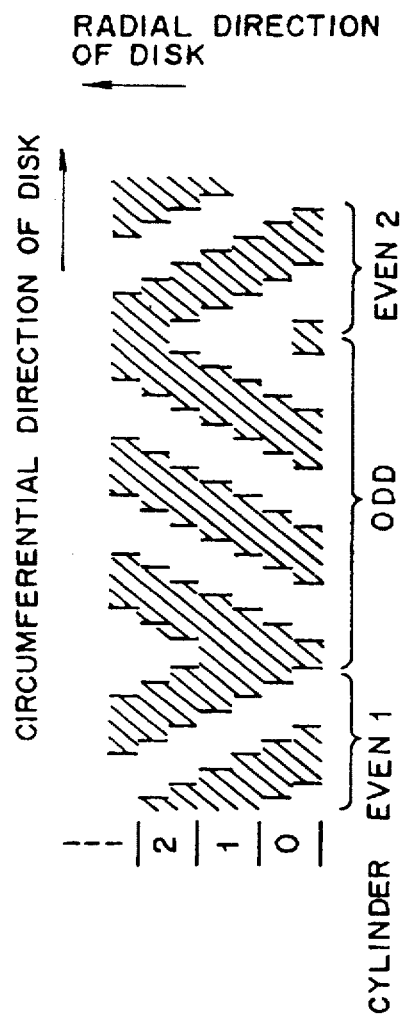
FIG. 16 is a diagram showing a conventional phase servo pattern.
Figure 17:
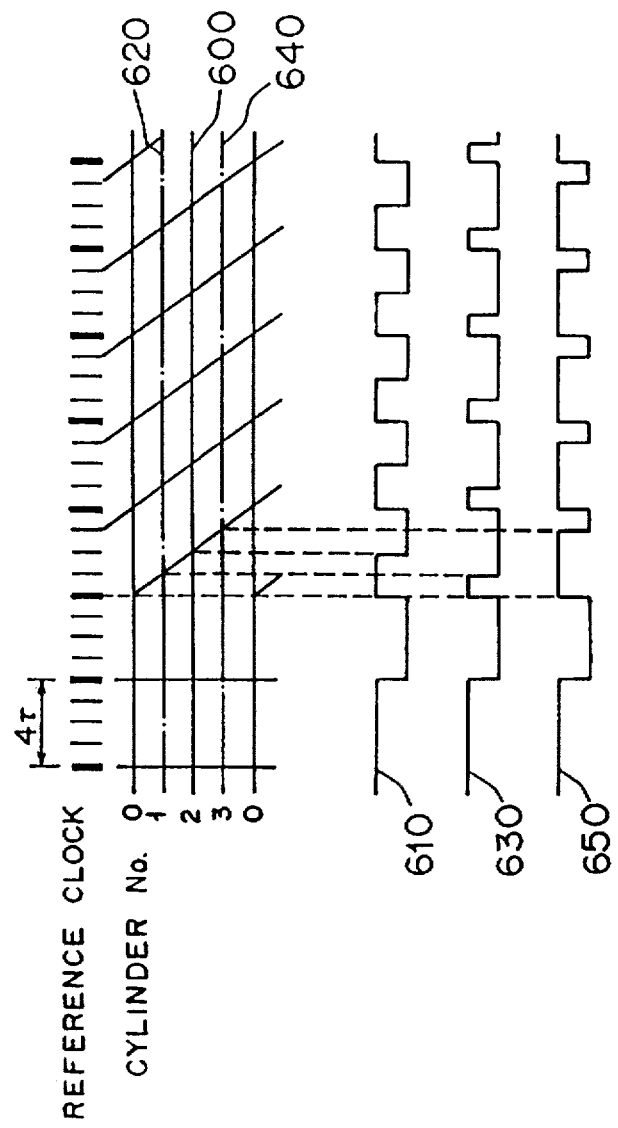
FIG. 17 is an explanatory chart for explaining detection of a phase difference using the servo pattern.
Figure 18:
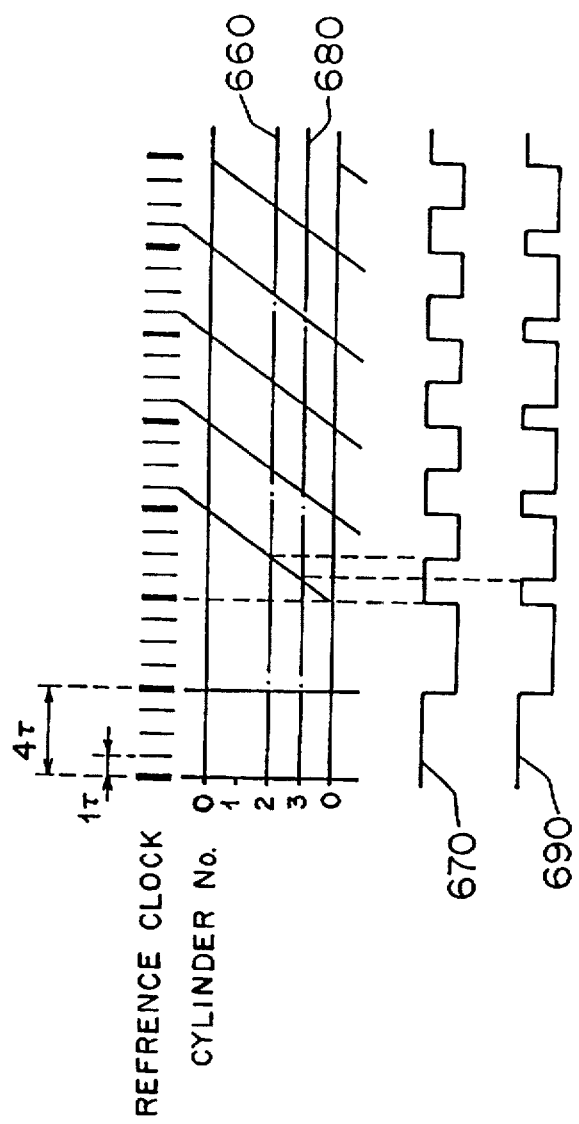
FIG. 18 is an explanatory chart for explaining detection of a phase difference using the servo pattern.

More specifically, the second phase difference detecting section 66B is provided with a flip-flop (a third flip-flop) 75-3, a flip-flop (a fourth flip-flop) 75-4, an EXCLUSIVE OR circuit (a second EXCLUSIVE OR circuit) 76-2 which performs exclusive-OR operation on outputs S1' and S2' of the flip-flops 75-3 and 75-4 (timing charts of the outputs S1' and S2' are shown in FIG. 15), a flip-flop (a fifth flip-flop) 75-5, a flip-flop (a sixth flip-flop) 75-6, an EXCLUSIVE OR circuit (a third EXCLUSIVE OR circuit) 76-3 which performs exclusive-OR operation on outputs S3' and S4' of the flip-flops 75-5 and 75-6, and an AND circuit 77 which outputs phase difference information by performing AND operation on outputs S5' and S6' of the EXCLUSIVE OR circuits 76-2 and 76-3. The master clock is input to the clock input terminal of the flip-flop 75-3, and the output S2' of the flip-flop 75-4 is input to the data input terminal of the flip-flop 75-3. The zero-cross signal is input to the clock input terminal of the flip-flop 75-4, and the output S1' of the flip-flop 75-3 is input to the data input terminal of the flip-flop 75-4. The master clock is input to the clock input terminal of the flip-flop 75-5, and the output S4' of the flip-flop 75-6 is input to the data input terminal of the flip-flop 75-5. A zero-cross inverted signal (a timing chart of the zero-cross inverted signal is shown in FIG. 15) which is made by inverting the zero-cross signal is input to the clock input terminal of the flip-flop 75-6. The output S3' of the flip-flop 75-5 is input to the data input terminal of the flip-flop 75-6. Numeral 76 denotes an invertor 76 for inverting the zero-cross signal.

On the basis of the control signal SELECT for controlling the operation of the selecting section 66C, the selecting section 66C outputs the phase difference information received from the first phase difference detecting section 66A, when the head 18 shown in FIG. 4 undergoes seek operation. On the other hand, when the head 18 undergoes on-track control, the selecting section 66C outputs the phase difference information received from the first phase difference detecting section 66B.

When being held at a high level, the control signal SELECT controls the selecting section 66C so as to output the phase difference information received from the first phase difference detecting section 66A, so that the positional signal is demodulated on an 8-cylinder group basis. On the other hand, when being held at a low level, the control signal SELECT controls the selecting section 66C so as to output the phase difference information received from the second phase difference detecting section 66B, so that the positional signal is demodulated on a 4-cylinder group basis.

In the disk apparatus of the present embodiment, the 8-cylinder group and the 4-cylinder group are switched from one group to the other group depending on the seek speed of the head 18. To this end, the control signal SELECT is input to the selecting section 66C from the drive processor 30 which grasps the seek speed of the head 18. In the case of a disk apparatus such as a compact disk apparatus without a drive processor, all that need to be is to input the control signal SELECT to the selecting section 66C from a microprocessor (MPU) 26, as shown in FIG. 2.

With this arrangement, in the head seek operation state, the disk apparatus according to the embodiment of the present invention carries out phase demodulation in order to control the positioning of the head used for reading data from, or writing data to, the disk medium while discriminating the different polarity information items contained in the servo patterns from one another using the servo patterns corresponding to eight cylinders. In the on-track control state, phase demodulation is carried out without discriminating the different polarity information items contained in the servo patterns using the servo patterns corresponding to four cylinders.

In the disk apparatus of the present embodiment, when the head undergoes seek operation, the phase demodulating device 80 shown in FIG. 6 outputs duty pulses received from the first phase difference detecting section 66A in such a way that the servo signal is demodulated using the 8-cylinder group servo patterns suitable to a high-speed seek operation. The head is roughly positioned using the servo signals demodulated according to the duty pulses.

If the head is located within a range of ±0.5 cylinder with respect of the target cylinder as a result of the seek operation of the head, the disk apparatus completes the head seek operation and, then, carries out on-track control for the head.

Further, in the disk apparatus of the present embodiment, when the head undergoes on-track control, the phase demodulating device 80 outputs duty pulses such that the servo signal is demodulated using the 4-cylinder group servo patterns which have a high degree of position detection accuracy. The on-track control of the head is carried out using the demodulated servo signal according to the duty pulses.

In the phase demodulating device 80, the selecting section 66C selects either the duty pulses output from the first phase difference detecting section 66A or the duty pulses output from the second phase difference detecting section 66B.

As a result, it becomes possible for the disk apparatus of the present embodiment to accurately demodulate the positional signal while carrying out a high-speed seek operation.

In other words, the DSP 30 of the disk apparatus performs the following operations:

To begin with, the DSP 30 receives a seek instruction from the host computer. The seek instruction is a command including a target track number. Next, the DSP 30 receives the current track number from an unillustrated circuit. The current track number is a track number on which the head is positioned when the DSP received the seek instruction. The current track number is reproduced through use of a well known circuit, and its explanation will be omitted here.

The DSP 30 then calculates a difference between the target track number and the current track number, and the calculated difference corresponds to a seek distance. On the basis of the difference, the DSP 30 refers to a table which holds speed curve information. Although the table is stored in a ROM (not shown), it may be held in the DSP 30.

The DSP 30 executes the head seek operation using the VCM 16 by outputting a value held in the table to the DA converter 40.

The DSP 30 outputs a select signal (the control signal SELECT) in order to select the 8-cylinder group when the readout value is set to the DAC 40.

During the seek operation, the DSP 30 calculates the difference by subtracting the target track number from the current track number, whenever a track zero-cross signal is obtained.

After the difference has become "1", the DSP 30 determines whether or not the head has arrived within a range of ±0.5 cylinder from the target track, on the basis of the track zero-cross signal. If the head has arrived at within the range of ±0.5 cylinder from the target track, the DSP 30 completes the seek operation and, then, carries out on-track control.

Specifically, the DSP 30 outputs the select signal (the control signal SELECT) in order to select the 4-cylinder group. Like the known technique, the DSP 30 carries out on-track control so as to cause the head to follow the target cylinder.

The operations carried out by the phase demodulating device 80 at that time will be described in a more detailed manner referring to FIGS. 8 to 15.

When the head seek operation is carried out, the servo signal is demodulated using the 8-cylinder group servo patterns.

The demodulation of a servo signal using the 8-cylinder group servo patterns is shown in FIG. 8.

In a phase servo pattern shown in the top portion of FIG. 8, servo information items having different phases are recorded on the servo plane in the circumferential direction of each cylinder when the servo plane of the magnetic disk is divided in units of eight cylinders from 0th to 7th.

Solid lines in the drawing represent phase servo patterns of the magnetic polarity N, and broken lines represent phase servo patterns of the magnetic polarity S. The phase servo patterns of the magnetic polarities N and S are composed of a first field EVEN and a second field ODD. Servo patterns recorded in the second field ODD are opposite in phase to those recorded in the first field EVEN.

The PLL clock PLL-CLK is in phase with the peak pulse obtained as a result of detecting the peak of the readout servo pattern waveform.

PLL-CK8-D0 to PLL-CK8-D7 are eight types of master clock generated from the PLL clock so as to correspond to each of the cylinders. The servo signal is demodulated using these master clocks PLL-CK8-D0 to PLL-CK8-D7.

At this time, the servo signal is demodulated in eight ways so as to correspond to the cylinders. It is decided which of the cylinders 0–7 is used as demodulation standards, on the basis of a remainder resulting from the division by eight. FIG. 9 is a table of the master clocks used when each of the cylinder is used (i.e., data used in logic design of the master clocks). In the table, 0–7 designate the master clocks PLL-CK8-D0 to PLL-CK8-D7, respectively.

DEMOD-WIN-D0 to DEMOD-WIN-D7 designate demodulation windows (DEMOD-WIN). As shown in FIG. 8, the phases of these DEMOD-WIN-D0 to DEMOD-WIN-D7 are determined by the phases of the master clocks PLL-CK8-D0 to PLL-CK8-D7. FIG. 10 is a table of the demodulation windows used when each cylinder is used (i.e., data used in logic design of the demodulation windows). In this table, 0–7 designate DEMOD-WIN-D0 to DEMOD-WIN-D7, respectively.

FIG. 11 shows the timing chart for the case where the servo signal is demodulated using the 8-cylinder group servo patterns.

The output S1 of the first flip-flop 75-1 and the output S2 of the second flip-flop 75-2 shown in FIG. 6 are produced from the master clock and the zero-cross signal which are generated using the master clock PLL-CLK. The duty pulses are produced from these outputs S1 and S2.

If the head is placed on the cylinder to be tracked, a duty ratio of the duty pulses becomes 50% (4/8). However, as shown in FIG. 11, the duty ratio of the duty pulses is 62.5% (5/8). From this fact, it is understood that the head is actually placed one cylinder away from the target cylinder.

In this way, as a result of demodulation of the servo-signal using the 8-cylinder group servo patterns, it becomes possible to detect the positional signal even if the head is subjected to seek operation at a high speed. However, as previously mentioned, the head is occasionally positioned one cylinder away from the target cylinder to be tracked.

To make it possible to correctly demodulate the positional signal while the head undergoes high-speed seek operation, the head is further subjected to on-track control.

When the head is subjected to on-track control, the servo signal is demodulated using the 4-cylinder group servo patterns.

FIG. 12 shows the demodulation of the servo signal using the 4-cylinder group servo patterns.

In a phase servo pattern shown in the top portion of FIG. 12, servo information items having different phases are recorded on the servo plane in the circumferential direction of each cylinder when the servo plane of the magnetic disk is divided in units of four cylinders from 0th to 4th. Although only either the servo pattern for the magnetic polarity N or the magnetic polarity S is shown in FIG. 12, the polarities N and S alternately appear. Therefore, if either the servo pattern for N or S is determined, the servo pattern for the other magnetic polarity is also determined.

The phase servo pattern in the solid line includes a first field EVEN 1, a second field ODD, and a third field EVEN 2. The servo patterns which are in phase with each other are recorded on the first and third fields EVEN 1 and EVEN 2. A servo pattern which has the opposite phase is recorded in the second field ODD. The position of the moving head is read in the center of the second field ODD.

As previously described, the PLL clock PLL-CLK is in phase with the peak pulse obtained as a result of detecting the peak of the readout servo pattern waveform.

PLL-CK4-D0 to PLL-CK4-D3 are four types of master clock generated from the PLL clock so as to correspond to each of the cylinders. The servo signal is demodulated using these master clocks PLL-CK4-D0 to PLL-CK4-D3.

At this time, the servo signal is demodulated in four ways so as to correspond to the cylinders. It is decided which of the cylinders 0–3 is used as demodulation standards, on the basis of a remainder resulting from the division of the servo plane by four. FIG. 13 is a table of the master clocks used when each of the cylinder is used (i.e., data used in logic design of the master clocks). In the table, 0–3 designate the master clocks PLL-CK4-D0 to PLL-CK4-D3, respectively.

DEMOD-WIN-D0 to DEMOD-WIN-D3 designate demodulation windows (DEMOD-WIN). As shown in FIG. 12, the phases of these DEMOD-WIN-D0 to DEMOD-WIN-D3 are determined by the phases of the master clocks PLL-CK4-D0 to PLL-CK4-D3. FIG. 14 is a table of the demodulation windows used when each cylinder is used (i.e., data used in logic design of the demodulation windows). In this table, 0–3 designate DEMOD-WIN-D0 to DEMOD-WIN-D3, respectively.

FIG. 15 shows the timing chart for the case where the servo signal is demodulated using the 4-cylinder group servo patterns.

The output Si' of the third flip-flop 75-3 and the output S2' of the fourth flip-flop 75-4 shown in FIG. 6 are produced from the master clock and the zero-cross signal which are generated using the master clock PLL-CLK.

On the other hand, the invertor 76, shown in FIG. 6, generates an inverted zero-cross signal. The outputs S3' of the fifth flip-flop 75-5 and the output S4' of the sixth flip-flop 75-6 are generated from the inverted zero-cross signal and the master clock.

The output S5' of the second EXCLUSIVE OR circuit 76-2 is produced from the outputs S1' and S2', whereas the output S6' of the third EXCLUSIVE OR circuit 76-3 is produced from the outputs S3' and S4'. The duty pulses are generated from the outputs S5' and S6'. Specifically, setting and resetting operations are carried out at the leading edge of said master clock and the leading edge and trailing edge of the zero-cross signal, as a result of which the duty pulses are generated.

If the head is placed on the cylinder to be tracked, a duty ratio of the duty pulses becomes 50% (2/4). However, as shown in FIG. 15, the duty ratio of the duty pulses is 75% (3/4). As previously described in the demodulation of the servo signal using the 8-cylinder group servo patterns, it is seen that the head is actually placed one cylinder away from the cylinder to be tracked as shown in FIG. 15.

The servo signal is demodulated again using the 4-cylinder group servo patterns after the head has been moved to the cylinder to be tracked. This operation is repeatedly carried out until the duty ratio of the duty pulses becomes 50%. Subsequently, the head is subjected to on-track control.

In this way, as a result of demodulating the servo signal using the 4-cylinder group servo patterns, the on-track control of the head allows the correct demodulation of the positional signal.

As has been described above, when the head undergoes seek operation, the positional signal is demodulated using the 8-cylinder group servo patterns which are suitable for the high-speed seek operation. Then, when the head undergoes on-track control, the positional signal is demodulated using the 4-cylinder group servo patterns which have a high position detection accuracy. As a result, it is possible to correctly demodulate the positional signal while the head undergoes high-speed seek operation, which much contributes to improvements in the reliability of the disk apparatus.

Although the disk apparatus, the phase demodulating device for use in the disk apparatus, and the phase demodulating method for use with the disk apparatus of the present invention have been described using the example where the disk apparatus is applied to the servo-plane servo system, the present invention is not limited to this type of disk apparatus. The present invention is also applicable to a disk apparatus using a data-plane servo system, and similar effects are still ensured.

What is claimed is:

1. A disk apparatus in which a plurality of servo patterns, each including different polarity information items alternately recorded in the circumferential direction of a disk medium, are sequentially recorded on said disk medium in the radial direction thereof with a predetermined phase difference with respect to each other, so as to correspond to respective cylinders, and the positioning of a head used for reading data from, or writing data onto, said disk medium is controlled on the basis of said servo patterns, said disk apparatus comprising:

a zero-cross signal detecting section for detecting a zero-cross signal on the basis of said servo patterns;

a master clock generating section for generating a master clock on the basis of said servo patterns;

a first phase difference detecting section which uses said zero-cross signal detected by said zero-cross signal detecting section and said master clock supplied from said master clock generating section and further uses servo patterns corresponding to N cylinders (N is an integer equal to or greater than 2) so as to discriminate the different polarity information items contained in said servo patterns from one another and to output information regarding a phase difference between the reference phase of said master clock and detection timing of said servo patterns produced from said zero-cross signal;

a second phase difference detecting section which uses said zero-cross signal detected by said zero-cross signal detecting section and said master clock supplied from said master clock generating section and further uses half said servo patterns corresponding to the N cylinders so as to output information on a phase difference between the reference phase of said master clock and detection timing of said servo patterns produced from said zero-cross signal without discriminating the different polarity information items contained in said servo patterns from one another;

a selecting section which outputs the phase difference information delivered from said first phase difference detecting section when seek operation is performed and outputs the phase difference information delivered from said second phase difference detecting section when on-track control is performed; and a phase difference information integrating section which integrates the phase difference information selected by said selecting section and outputs a position control signal for controlling the positioning of said head.

2. The disk apparatus according to claim 1, wherein said first phase difference detecting section comprises a first flip-flop, a second flip-flop, and a first EXCLUSIVE-OR circuit which outputs, as phase difference information, the result of exclusive-OR operation on outputs from said first and second flip-flops, said master clock being input to the clock input terminal of said first flip-flop circuit, and the output of said second flip-flop being input to the data input terminal of said first flip-flop, while said zero-cross signal being input to the clock input terminal of said second flip-flop, and the output of said first flip-flop being input to the data input terminal of said second flip-flop; and said second phase difference detecting section comprises a third flip-flop, a fourth flip-flop, a second EXCLUSIVE-OR circuit for performing exclusive-OR operation on outputs from said third and fourth flip-flops, a fifth flip-flop, a sixth flip-flop, a third EXCLUSIVE-OR circuit for performing exclusive-OR operation on outputs from said fifth and sixth flip-flops, and an AND circuit for performing AND operation on outputs from said second and third EXCLUSIVE-OR circuits, said master clock being input to the clock input terminal of said third flip-flop, and the output of said fourth flip-flop being input to the data input terminal of said third flip-flop;

said zero-cross signal being input to the clock input terminal of said fourth flip-flop, and the output of said third flip-flop being input to the data input terminal of said fourth flip-flop;

said master clock being input to the clock input terminal of said fifth flip-flop, and the output of said sixth flip-flop being input to the data input terminal of said fifth flip-flop; and a signal obtained by inverting said zero-cross signal being input to the clock input terminal of said sixth flip-flop, and the output of said fifth flip-flop being input to the data input terminal of said sixth flip-flop.

3. A phase demodulating device for a disk apparatus comprising a disk medium on which a plurality of servo patterns, each including different polarity information items alternately recorded in the circumferential direction, are sequentially recorded in the radial direction thereof with a predetermined phase difference with respect to each other, so as to correspond to respective cylinders, said phase demodulating device comprising:

a zero-cross signal detecting section for detecting a zero-cross signal corresponding to each polarity information contained in said servo patterns;

a master clock generating section for generating a master clock on the basis of said servo patterns;

a first phase difference detecting section which outputs information on a phase difference between detection timing of said servo patterns produced from said zero-cross signal corresponding to any one of the polarity information items and the reference phase of said master clock;

a second phase difference detecting section which outputs information on a difference between detection timing of said servo patterns produced from said zero-cross signal corresponding to each polarity information and the reference phase of said master clock; and a selecting section which selectively outputs phase difference information delivered from said first phase difference detecting section or phase difference information delivered from said second phase difference detecting section.

4. A phase demodulating method for a disk apparatus in which a plurality of servo patterns, each including different polarity information items alternately recorded in the circumferential direction, are sequentially recorded on a disk medium in the radial direction thereof with a predetermined phase difference with respect to each other, so as to correspond to respective cylinders, and the positioning of a head used for reading data from, or writing data onto, the disk medium is controlled on the basis of said servo patterns, said phase demodulating method comprising the steps of:

in a predetermined control state, using servo patterns corresponding to N cylinders (N is an integer equal to or greater than 2) so as to discriminate the different polarity information items contained in said servo patterns from one another and to carry out phase demodulation for controlling the positioning of said head used for reading data from, or writing data to, said disk medium; and in a control state different from the predetermined control state, using half said servo patterns corresponding to the N cylinder so as to carry out the phase demodulation for controlling the positioning of said head without discriminating the different polarity information items contained in said servo patterns from one another.

5. The phase demodulating method for a disk apparatus according to claim 4, wherein in the predetermined control state, said head undergoes a seek operation, servo patterns corresponding to N cylinders are used so as to discriminate the different polarity information items contained in said servo patterns from one another and to carry out phase demodulation for controlling the positioning of said head; and in the control state different from the predetermined control state, said head undergoes on-track control, half said servo patterns corresponding to the N cylinder are used so as to carry out the phase demodulation for controlling the positioning of said head without discriminating the different polarity information items contained in said servo patterns from one another.

* * * * *